(12) United States Patent
Umeya et al.

(10) Patent No.: US 7,035,006 B2
(45) Date of Patent: Apr. 25, 2006

(54) SCREEN FOR IMAGE DISPLAY APPARATUS, METHOD FOR MANUFACTURING SCREEN FOR IMAGE DISPLAY APPARATUS, AND IMAGE DISPLAY APPARATUS

(75) Inventors: Shinjiro Umeya, Miyagi (JP); Yoshinori Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 10/618,351

(22) Filed: Jul. 11, 2003

(65) Prior Publication Data
US 2004/0104663 A1 Jun. 3, 2004

(30) Foreign Application Priority Data
Jul. 11, 2002 (JP) .............................. 2002-203179

(51) Int. Cl.
G03B 21/56 (2006.01)
G03B 21/60 (2006.01)
G03H 1/10 (2006.01)
G03H 1/12 (2006.01)
G03H 1/26 (2006.01)
G02B 27/28 (2006.01)
G02F 1/135 (2006.01)

(52) U.S. Cl. .......................... 359/443; 359/10; 359/11; 359/22; 359/454; 359/459; 359/487; 359/589; 359/634; 349/25

(58) Field of Classification Search .................... 359/1, 359/9–11, 22, 443, 454–455, 459, 487, 589, 359/634; 349/25
See application file for complete search history.

(56) References Cited

U.S. PATENT DOCUMENTS 5,715,083 A * 2/1998 Takayama .................... 359/443
6,313,931 B1 * 11/2001 Gnaedig et al. .............. 359/15
6,414,727 B1 * 7/2002 Benton ........................ 348/744

* cited by examiner

Primary Examiner—W. B. Perkey
Assistant Examiner—Magda Cruz
(74) Attorney, Agent, or Firm—Sonnenschein Nath & Rosenthal LLP

(57) ABSTRACT

A screen for image display apparatus according to the present invention has a base member, a light absorption layer formed on the base member and adapted for absorbing light of a visible light range, and a light control layer formed on the light absorption layer. The light control layer reflects projected image display light to form an image and has a reflection wavelength selection function of selectively reflecting light of the wavelength range of the image display light. By using the screen for image display apparatus according to the present invention, a user can easily enjoy large-screen image display even in a bright environment.

44 Claims, 22 Drawing Sheets

EMISSION WAVELENGTH CHARACTERISTIC OF MEDIUM-PRESSURE MERCURY LAMP

EMISSION WAVELENGTH CHARACTERISTIC OF RED SEMICONDUCTOR LASER

WAVELENGTH CHARACTERISTIC OF HYBRID LIGHT SOURCE INCLUDING MEDIUM-PRESSURE MERCURY (3MPa) AND RED LASER

FIG.39A REPRODUCING WAVELENGTH CHARACTERISTIC OF PROJECTOR

FIG.39B REFLECTION WAVELENGTH CHARACTERISTIC OF SCREEN

FIG.39C WAVELENGTH CHARACTERISTIC OF PERIPHERAL LIGHT

FIG.40A REPRODUCING WAVELENGTH CHARACTERISTIC OF PROJECTOR

FIG.40B REFLECTION WAVELENGTH CHARACTERISTIC OF SCREEN

FIG.40C WAVELENGTH CHARACTERISTIC OF PERIPHERAL LIGHT

SCREEN FOR IMAGE DISPLAY APPARATUS, METHOD FOR MANUFACTURING SCREEN FOR IMAGE DISPLAY APPARATUS, AND IMAGE DISPLAY APPARATUS

BACKGROUND OF THE INVENTION

1. Field of the Invention

This invention relates to a screen for image display apparatus that displays an image as image display light is projected thereon by an image display apparatus, a method for manufacturing such a screen for an image display apparatus, and an image display apparatus that projects and displays an image corresponding to image information on a screen.

This application claims priority of Japanese Patent Application No. 2002-203179, filed on Jul. 11, 2002, the entirety of which is incorporated by reference herein.

2. Description of the Related Art

Conventionally, an image display apparatus called "front projector" has been proposed as an image display apparatus that enable a user to easily enjoy a large-screen image.

As such an image display apparatus, there has been proposed an image display apparatus of a structure having three cathode ray tubes (CRT) that display R (red), G (green) and B (blue) components of an image, respectively, so that images displayed by these cathode ray tubes are superimposed via an R (red) filter, a G (green) filter and a B (blue) filter and projected on a screen from the front side. However, such a "three-CRT type" image display apparatus has a large-size and heavy structure and therefore is not much popularized for home application.

Recently, an image display apparatus of a "front projector" type using a liquid crystal display instead of cathode ray tubes has been proposed. In the case of this image display apparatus, the structure can be reduced in size and weight and its setting is easy. Therefore, this image display apparatus is expected to be popularized for home application.

In the "front projector"-type image display apparatus as described above, when peripheral light that is not related with image display becomes incident, there arises a problem that the contrast of a displayed image deteriorates, lowering the visibility of the image. Particularly in an environment where peripheral light is bright, image display with sufficient contrast cannot be performed.

In the conventional "front projector" type image display apparatus, an image is projected and displayed on a white screen. This screen not only reflects the light for performing display of the projected image but also reflects peripheral light. Therefore, in a light room, the contrast of the displayed image relatively deteriorates, lowering the visibility.

In the case of using such an image display apparatus, it is necessary to prepare the environment, for example, darken the room, in order to prevent peripheral light from becoming incident on the screen. However, it is difficult to darken a room at an ordinary home during the daytime. Even in the night, if the lighting is turned off to darken the room, things cannot be seen except for a displayed image. This causes inconvenience.

SUMMARY OF THE INVENTION

Thus, it is an object of the present invention to provide a screen for image display apparatus that enables display of an image with good contrast and high visibility, a method for manufacturing a screen for image display apparatus adapted for manufacturing such a screen for image display apparatus, and an image display apparatus.

In order to solve the foregoing problems, a screen for image display apparatus according to the present invention includes: a base member; a light absorption layer formed on the base member and adapted for absorbing light of a wavelength range covering substantially an entire visible light range; and a light control layer formed on the light absorption layer; the light control layer having a diffuse image forming function of causing diffuse reflection of image display light projected via projection image forming means and thus forming an image, and a reflection wavelength selection function of selectively reflecting light of the wavelength range of the image display light and transmitting light of the other wavelength ranges.

In this screen for image display apparatus, as the image display light projected via the projection image forming means is diffuse-reflected to form an image in the light control layer and selectively reflected by wavelength range, the image display light is reflected by a greater quantity than light of the other wavelength ranges. Therefore, image display can be performed while restraining the influence of external light.

In a method for manufacturing a screen for image display apparatus according to the present invention, a reflective holographic screen is formed using light beams of primary colors that decide a color reproducing wavelength in an image projector, as object light and reference light, thus providing a reflection wavelength characteristic corresponding to the color reproducing wavelength of the image projector.

In this method for manufacturing a screen for image display apparatus, since the screen for image display apparatus is formed as a reflective holographic screen, it has a reflection wavelength characteristic corresponding to the color reproducing wavelength of the image projector and can perform image display while restraining the influence of external light.

In another method for manufacturing a screen for image display apparatus according to the present invention, a material prepared by mixing plural types of toner particles is applied on a projection surface, thus providing a reflection wavelength characteristic corresponding to a color reproducing wavelength of an image projector.

In this method for manufacturing a screen for image display apparatus, the material prepared by mixing plural types of toner particles is applied on the projection surface, and the screen for image display apparatus has a reflection wavelength characteristic corresponding to the color reproducing wavelength of the image projector. Therefore, the screen for image display apparatus can perform image display while restraining the influence of external light.

An image display apparatus according to the present invention includes: a light source for emitting primary-color light of red, green and blue; a spatial light modulator for modulating the intensity of the light beam emitted from the light source in accordance with image information; projection image forming means for causing image formation on a screen, of the primary-color light with its intensity modulated by the spatial light modulator; and peripheral light generating means for illuminating the screen with peripheral light having a wavelength different from the wavelength of the primary-color light.

In this image display apparatus, the screen has a higher reflectance for the primary-color light than for the peripheral light and has a lower absorptivity for the primary-color light than for the peripheral light.

In this image display apparatus, since the screen has a higher reflectance for the primary-color light with its intensity modulated by the spatial light modulator than for the peripheral light and has a lower absorptivity for the primary-color light than for the peripheral light, it can perform image display while restraining the influence of external light.

Another image display apparatus according to the present invention includes: a light source for emitting light of two colors of primary colors of red, green and blue, and an ultraviolet ray; a spatial light modulator for modulating the intensity of the light beam emitted from the light source in accordance with image information; projection image forming means for causing image formation on a screen, of the two-color light and the ultraviolet ray with their intensities modulated by the spatial light modulator; and peripheral light generating means for illuminating the screen with peripheral light having a wavelength different from the wavelengths of the two-color light and the ultraviolet ray.

In this image display apparatus, the screen has a higher reflectance for the two-color light than for the peripheral light and has a lower absorptivity for the two-color light than for the peripheral light, and the screen also has a color conversion layer for converting the ultraviolet ray to light of the remaining one color of the primary colors.

In this image display apparatus, the screen has a higher reflectance for the intensity-modulated two-color light than for the peripheral light and has a lower absorptivity for the two-color light than for the peripheral light, and the screen also converts the intensity-modulated ultraviolet ray to light of the remaining one color of the primary colors. Therefore, the screen can perform image display while restraining the influence of external light.

As described above, in the screen for image display apparatus according to the present invention, image display light projected via the projection image forming means is diffuse-reflected to form an image by the light control layer and is selectively reflected by wavelength range. Therefore, the image display light is reflected by a greater quantity than light of the other wavelength ranges and image display can be performed while restraining the influence of external light.

By using the screen for image display apparatus, a user can easily enjoy large-screen image display even in a bright environment. Since the screen can perform image display in a bright environment, it can be used in an environment similar to that of a conventional television receiver while having a less deep structure than that of the conventional television receiver.

In the image display apparatus using this screen for image display apparatus, since an image having sufficient contrast can be displayed even in a bright environment without increasing the making power, the power consumption for projected light output can be reduced.

In the image display apparatus according to the present invention, an image is projected on the screen by primary-color light and the screen and its periphery are illuminated by peripheral light having a wavelength characteristic different from that of the primary-color light. The screen has a reflection wavelength characteristic of reflecting only the primary-color light. Therefore, large-screen image display can be easily performed even in a bright environment.

Moreover, as this image display apparatus can be compactly housed when not in use, the image display apparatus generates less wastes when it is discarded.

BRIEF DESCRIPTION OF THE DRAWINGS

FIG. 23A shows the reflection wavelength characteristic of a toner particle of blue (B). FIG. 23B shows the reflection wavelength characteristic of a toner particle of green (G). FIG. 23C shows the reflection wavelength characteristic of a toner particle of red (R).

FIG. 39A is a graph showing a wavelength characteristic of projected light to the screen (laser light source).

FIG. 39B is a graph showing a wavelength characteristic with respect to reflectance on the screen.

FIG. 39C is a graph showing spectral intensity of peripheral light from a fluorescent lamp.

FIG. 40A is a graph showing a wavelength characteristic of projected light to the screen (metal halide lamp).

FIG. 40B is a graph showing a wavelength characteristic with respect to reflectance on the screen.

FIG. 40C is a graph showing spectral intensity of filtered peripheral light from a fluorescent lamp.

DESCRIPTION OF THE PREFERRED EMBODIMENTS

Preferred embodiments of the present invention will now be described with reference to the drawings.

[Structure of Screen for Image Display Apparatus]

Figure 1:
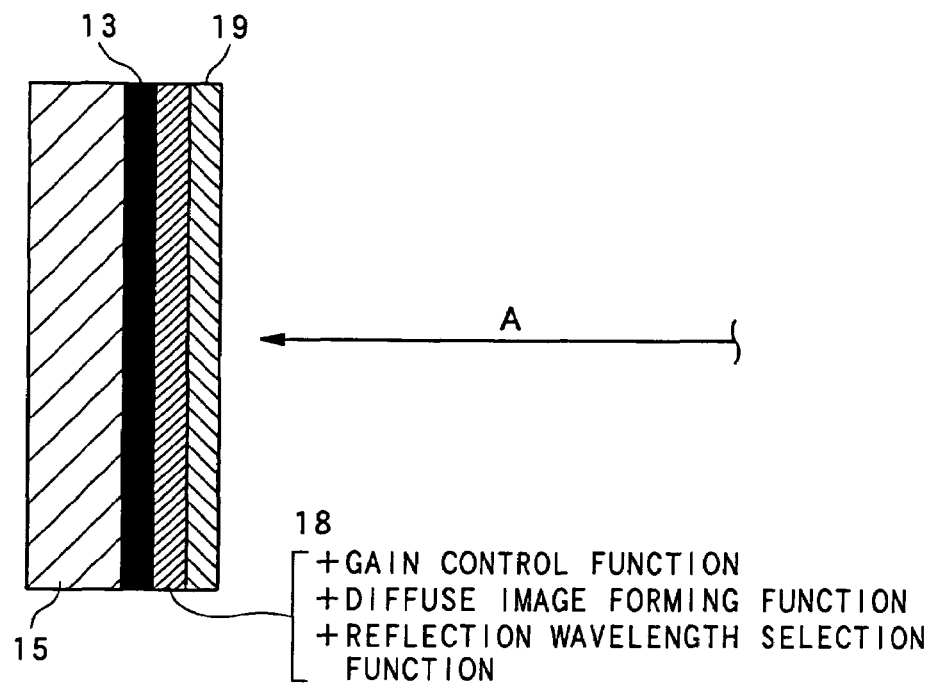
FIG. 1 is a side sectional view showing a structure of a screen for image display apparatus according to the present invention.

A screen for image display apparatus according to the present invention has a structure in which a light absorption layer 13, a light control layer 18 and an external light reduction layer 19 are sequentially stacked on a front part of a base member 15, as shown in FIG. 1. The light control layer 18 has a diffuse image forming function, a reflection wavelength selection function, and a gain control function. When this screen for image display apparatus is constructed in an image display apparatus, image display light is projected onto the screen via projection image forming means, as indicated by an arrow A in FIG. 1.

Figure 21:
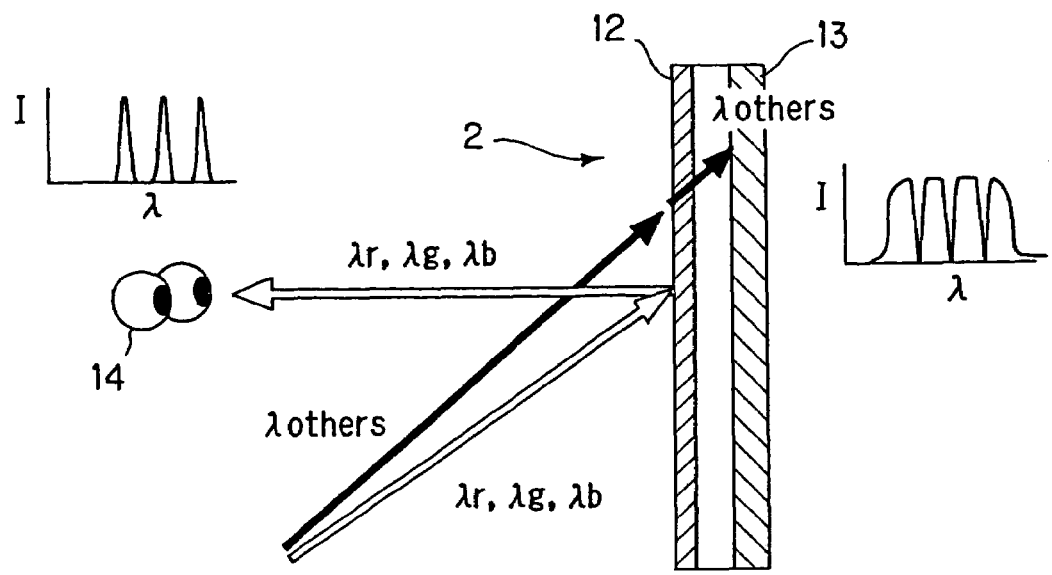
FIG. 21 is a side view showing an action of a holographic screen in the image display apparatus.

When this screen for image display apparatus is constructed in an image display apparatus as will be described later, image display light having wavelengths $\lambda r$, $\lambda g$ and $\lambda b$ projected via projection image forming means is transmitted through the external light reduction layer 19, then selectively reflected by wavelength by the light control layer 18 to perform diffuse image formation, then gain-controlled in a predetermined direction, and emitted to the front side, thus reaching the eyes of an observer 14, as shown in FIG. 21. It is desired that the wavelengths $\lambda r$, $\lambda g$ and $\lambda b$ of the image display light are coincident with the reflection wavelength in the reflection wavelength selection function of the light control layer 18.

Meanwhile, external light having a wavelength $\lambda$others, which is different from $\lambda r$, $\lambda g$ and $\lambda b$, is reduced by the external light reduction layer 19. After that, the majority of the external light is transmitted through the light control layer 18 without being selected as the reflection wavelength by the light control layer 18 and is then absorbed by the light absorption layer 13. It is desired that the wavelength $\lambda$others of the external light is not coincident with the reflection wavelength in the reflection wavelength selection function of the light control layer 18.

Figure 2:
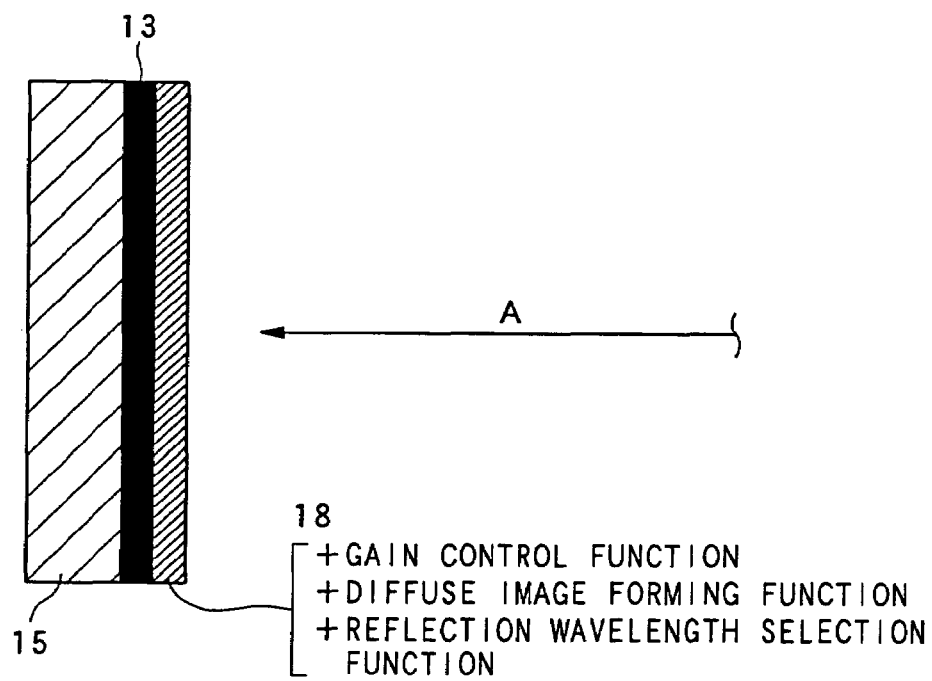
FIG. 2 is a side sectional view showing another exemplary structure (without having an external light reduction layer) of the screen for image display apparatus according to the present invention.

The external light reduction layer 19 may be omitted depending on the application and environment, as shown in FIG. 2.

The base member 15 is made of a material that is highly adherent to the light absorption layer 13, can maintain the shape of the screen for image display apparatus and is easy to handle. Specifically, the base member 15 is made of, for example, a synthetic resin material such as plastics or a fiber material in a sheet-like form. It is also desired that the base member 15 is made of a material that enables rolling and housing of the base member 15 in a cylindrical shape.

The light absorption layer 13 is made of a material having a characteristic of absorbing light of a substantially entire visible light range, for example, black paint or a black film-like material. The light absorption layer 13 is formed by applying black paint or laminating a black film-like material onto the front part of the base member 15.

If the base member 15 itself is made of a light absorption material such as a black synthetic resin material, it can be considered that the base member 15 is integrally constituted with the light absorption layer 13 and therefore the light absorption layer 13 need not be provided separately. In this case, the base member 15 also has a light absorption function.

Figure 3:
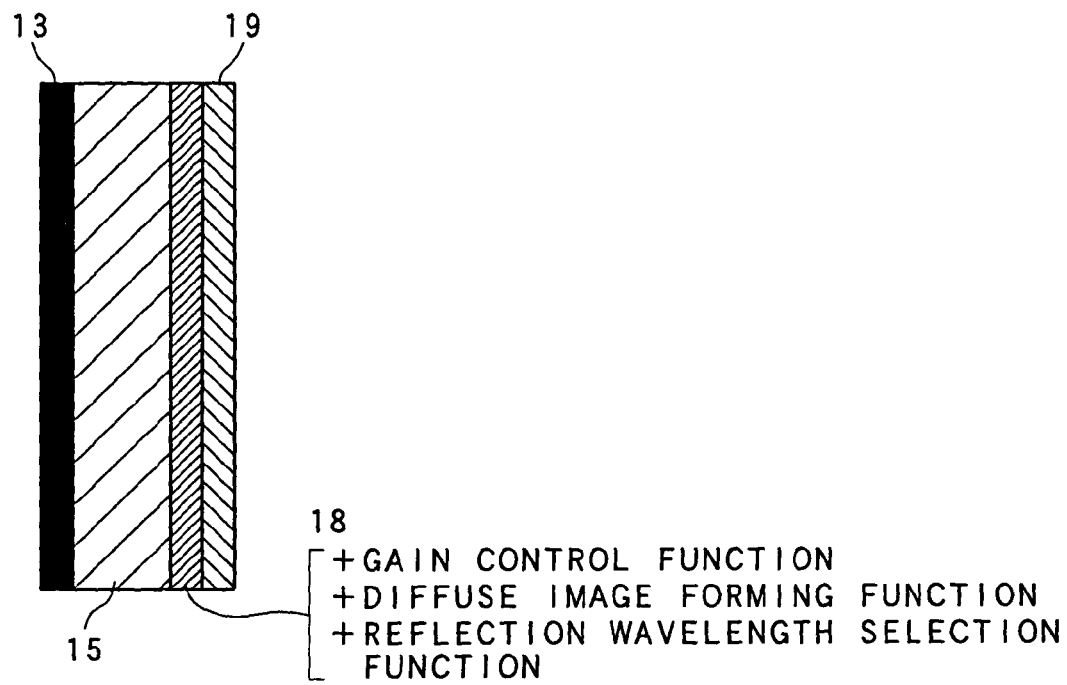
FIG. 3 is a side sectional view showing still another exemplary structure (having a light absorption layer 13 arranged behind a base member) of the screen for image display apparatus according to the present invention.

If the base member 15 is made of a transparent material, the light absorption layer 13 may be provided on the back side part of base member 15, as shown in FIG. 3.

Figure 4:
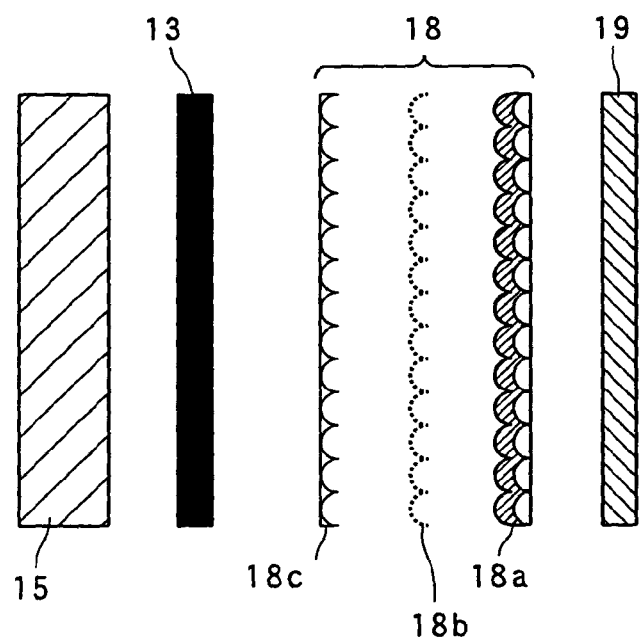
FIG. 4 is an exploded side sectional view showing the structure of the screen for image display apparatus and a structural part in charge of a gain control function.

The gain control function in the light control layer 18 is a function of collecting in a predetermined direction and reflecting image display light projected via the projection image forming means. The gain control function is realized as the light control layer 18 has a lens effect. To realize such a gain control function, a lens structure having plural concaves arrayed therein may be provided in a front part of a reflection layer 18a of the light control layer 18, as shown in FIG. 4. (Hereinafter, the structure having plural concaves arrayed therein is referred to as "lens structure".) This reflection layer 18a is a layer for reflecting image display light and is situated most closely to the front side in the light control layer 18. To provide the reflection layer 18a with the lens structure, a front part of a support layer 18c that supports the reflection layer 18a from its back side may have a lens structure.

Between the support layer 18c and the reflection layer 18a, a diffusion structure 18b for realizing the diffuse image forming function is formed, which will be described later.

Figure 5:
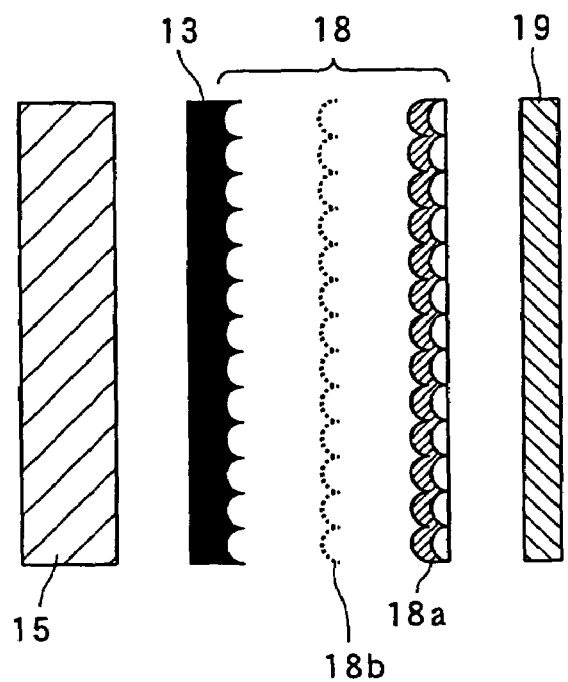
FIG. 5 is an exploded side sectional view showing the structure of the screen for image display apparatus and another exemplary structural part in charge of the gain control function.

To realize the gain control function in the light control layer 18, the front part of the black base member 15 or the black light absorption layer 13 may be processed to have a lens structure and the reflection layer 18a may be formed thereon by evaporation or the like, as shown in FIG. 5. Also in this case, the diffusion structure 18b is formed between the base member 15 or the light absorption layer 13. In this case, it can be considered that the support layer of the light control layer 18 is integrally constituted with the base member 15 or the light absorption layer 13.

Figure 6:
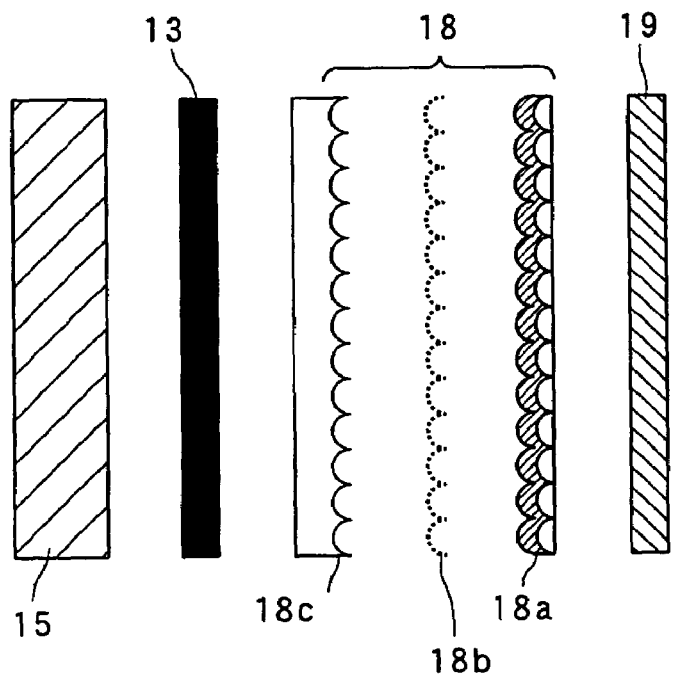
FIG. 6 is an exploded side sectional view showing the structure of the screen for image display apparatus and a structural part in charge of an image forming reflection function.

The diffuse image forming function in the light control layer 18 is a function of the reflection layer 18a diffusing image display light to form a display image. To realize such a function of the reflection layer 18a, the interface between the support layer 18c and the reflection layer 18a or the interface between the base member 15 or the light absorption layer 13 and the reflection layer 18a may have the diffusion structure 18b made up of a sufficiently fine convex and concave structure or a micro-mirror array structure, as shown in FIGS. 4, 5 and 6.

Figure 7:
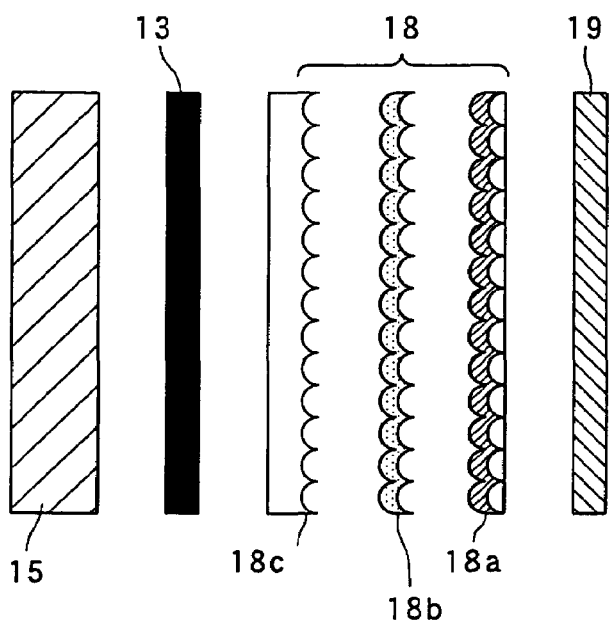
FIG. 7 is an exploded side sectional view showing the structure of the screen for image display apparatus and another exemplary structural part in charge of the image forming reflection function.

To realize the diffuse image forming function, the diffusion layer 18b in which fine particles having a different refractive index are dispersed may be formed between the support layer 18c and the reflection layer 18a or between the base member 15 or the light absorption layer 13 and the reflection layer 18a, as shown in FIG. 7. This diffusion layer 18b has a structure constructed by dispersing fine particles having a different refractive index from that of a base material having substantially the same refractive index as the support layer 18c or the reflection layer 18a, into the base material.

Figure 8:
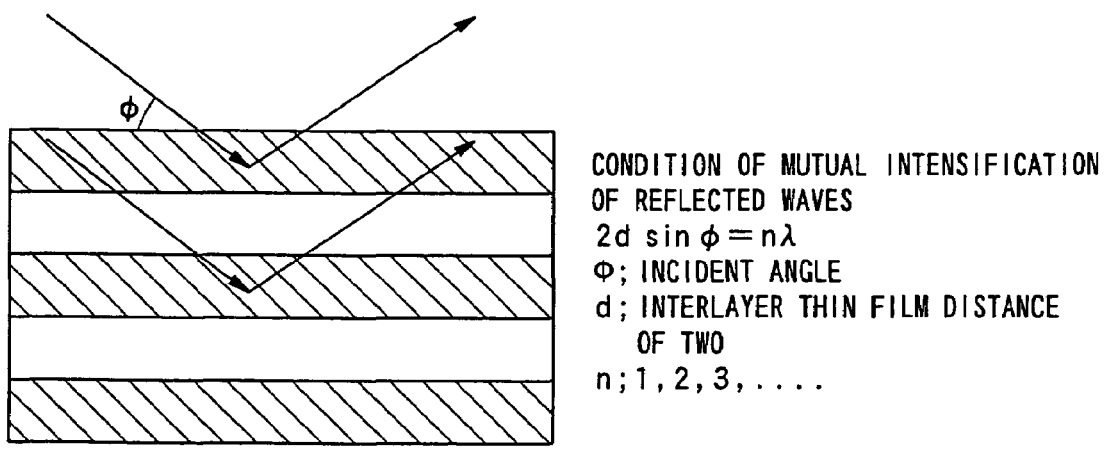
FIG. 8 is a sectional view showing the principle of Bragg reflection occurring in a light control layer of the screen for image display apparatus.

Next, the reflection wavelength selection function in the light control layer 18 is a function of selectively reflecting only light of a wavelength range equivalent to that of image display light projected from the front side and transmitting light of the other wavelength ranges. Such a reflection wavelength selection function is realized by utilizing so-called Bragg reflection, as shown in FIG. 8. Specifically, in a structure in which plural layers of difference refractive indexes are alternately stacked, a light beam incident at a predetermined incident angle $\Phi$ on the interface between the layers of difference refractive indexes is intensified by reflected light in each layer and thus shows a high reflective index as a whole, if the following condition is met where d represents the interlayer distance and $\lambda$ represents the wavelength of incident light.

$$2d\sin\Phi = n\lambda (\because n \text{ is a natural number } (1, 2, 3 \ldots))$$

Figure 9:
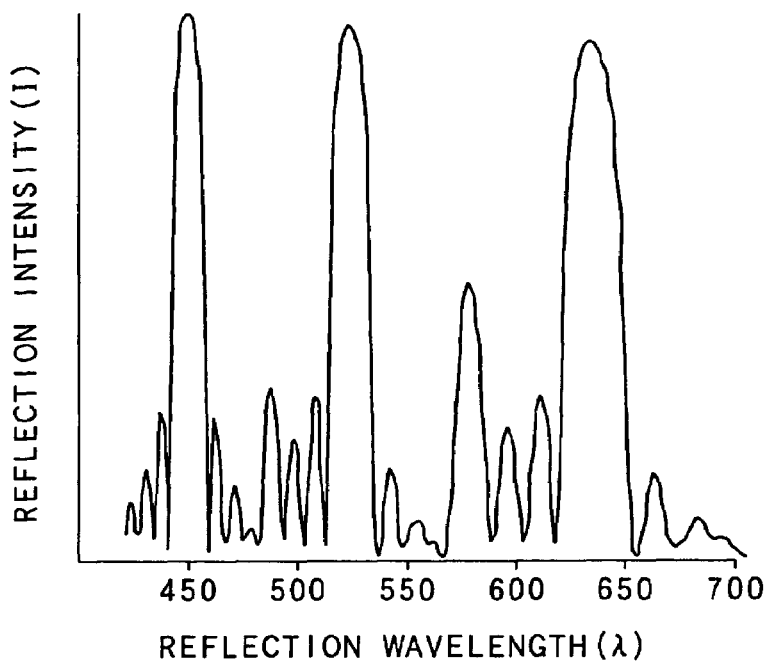
FIG. 9 is a graph showing a spectral reflection characteristic in the case the light control layer of the screen for image display apparatus is constructed as a multilayer thin film band-pass filter using a Bragg reflection film.

By forming a multilayer thin film structure set to generate such Bragg reflection for image display light, it is possible to construct the reflection layer 18a having the reflection wavelength selection function corresponding to the wavelength of image display light. That is, the reflection layer 18a can be formed as a multilayer thin film band-pass filter. The multilayer thin film band-ass filter has a characteristic of reflecting only light of a predetermined wavelength range corresponding to B (blue), G (green) and R (red) and transmitting light of the other wavelength ranges, as shown in FIG. 9.

The reflection layer 18a can also have the reflection wavelength selection function by being formed as a reflective hologram or as a toner layer coated with a mixed preparation of several types of toner (pigment) particles. The method for forming the reflective hologram and the toner layer, and their characteristics will be described later with reference to FIGS. 19 to 23A–23C.

Figure 10:
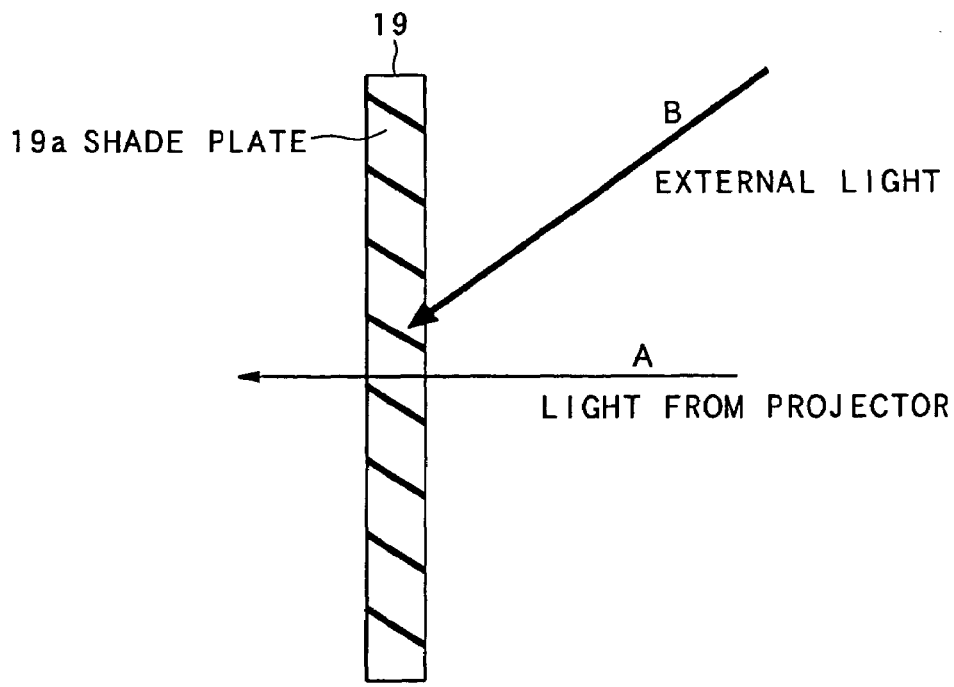
FIG. 10 is a side sectional view showing the structure of an external light reduction layer having a shade plate in the screen fir image display apparatus.

The external light reduction layer 19 is a layer defined to absorb almost no image display light but transmit image display light and to absorb other light. As shown in FIG. 10, the external light reduction layer 19 can have a structure having plural fine shade plates 19a like a so-called shade curtain. This external light reduction layer 19 transmits incident light that becomes incident on the screen for image display apparatus substantially from the front side, like image display light projected via the projection image forming means, indicated by an arrow A in FIG. 10. The external light reduction layer 19 also has the plural fine shade plates 19a intercepting incident light that becomes incident from another direction, indicated by an arrow B in FIG. 10. That is, these shade plates 19a are arranged in a direction substantially along the incident direction of image display light and in a direction substantially perpendicular to the front part of the screen for image display apparatus. The surface parts of these shade plates 19a are coated with black paint so as to absorb light incident on the surface parts of the shade plates.

Figure 11:
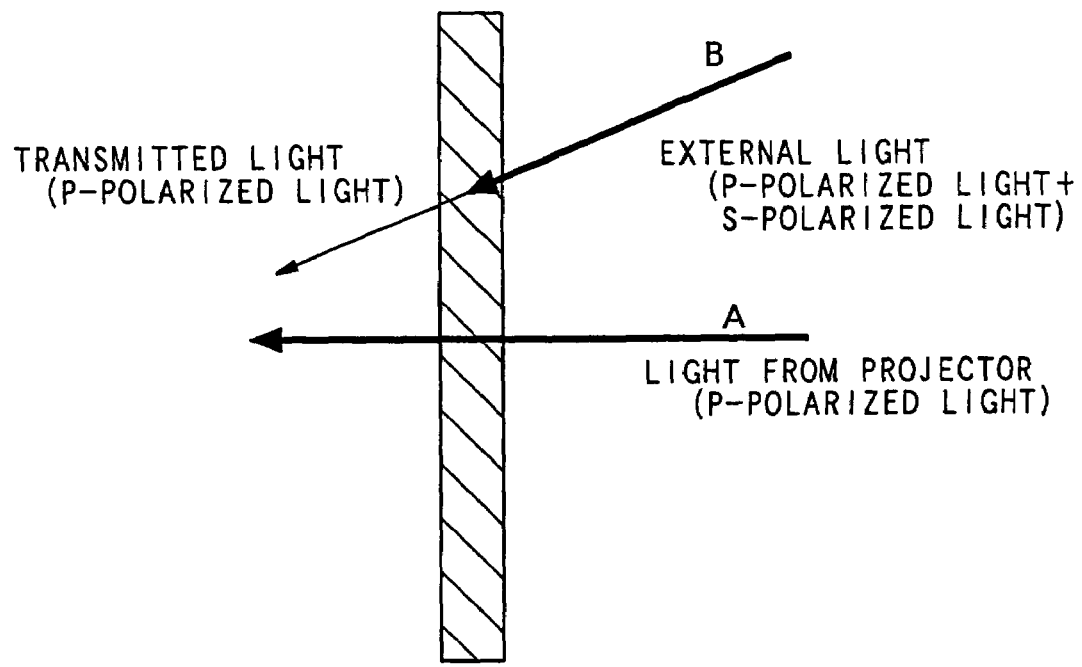
FIG. 11 is a side sectional view showing the structure of an external light reduction layer made up of an absorption polarizing plate in the screen for image display apparatus.

The external light reduction layer 19 can also be constructed using an absorption polarizing plate, as shown in FIG. 11. Specifically, it is assumed that image display light is polarized in a specific direction, for example, P-polarized, and that an absorption polarizing plate that transmits only the light polarized in this specific direction indicated by an arrow A in FIG. 11 and absorbs light polarized in other directions is used as the external light reduction layer 19. Then, of external light obtained by mixing light of various states of polarization, indicated by an arrow B in FIG. 11, only a component in a state of polarization similar to that of the image display light is transmitted through the external light reduction layer 19 and the components of the other states of polarization are absorbed by the externa light reduction layer 19.

For the screen for image display apparatus according to the present invention, in order to realize the above-described functions, various constructions can be implemented by selecting and combining structures in charge of each function. Hereinafter, typical examples of the construction of the screen for image display apparatus will be described in which the structures in charge of the above-described functions are suitably combined.

Figure 12:
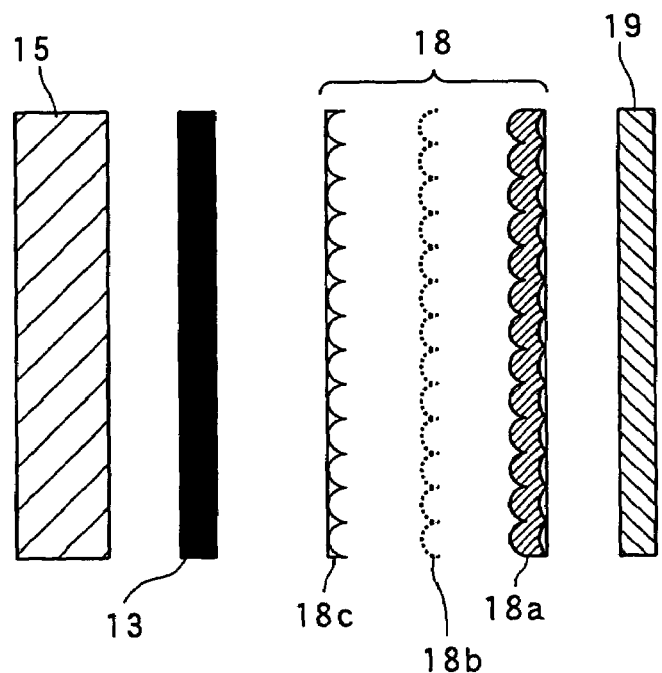
FIG. 12 is an exploded side sectional view showing a first exemplary structure of the screen for image display apparatus.

In this screen for image display apparatus, as shown in FIG. 12, the light absorption function can be realized by using a black film bonded to the front part of the base member 15, and the gain control function can be realized by processing the front part of the support layer 18c of the light control layer 18 to have a lens structure. The diffuse image forming function can be realized by providing the convex and concave diffusion structure 18b on the interface between the support layer 18c and the reflection layer 18a, and the reflection wavelength selection function can be realized by using a multilayer thin film band-pass filter as the reflection layer 18a. The external light reduction function can be realized by the external light reduction layer 19 made of an absorption polarizing plate.

Figure 13:
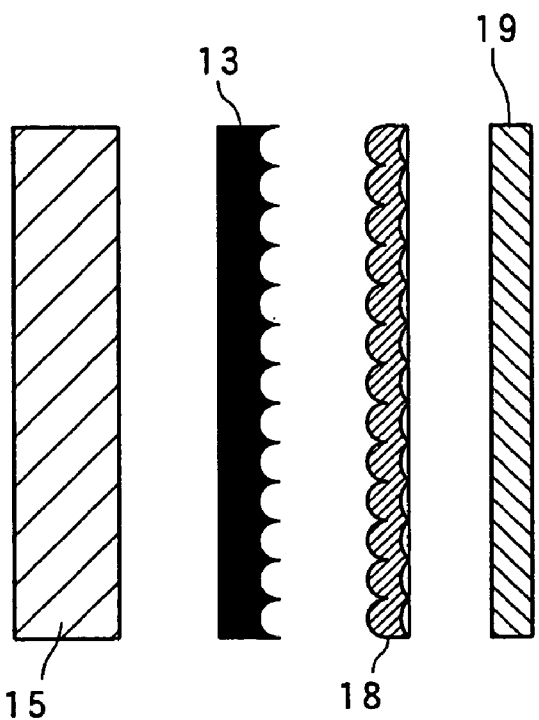
FIG. 13 is an exploded side sectional view showing a second exemplary structure of the screen for image display apparatus.
Figure 14:
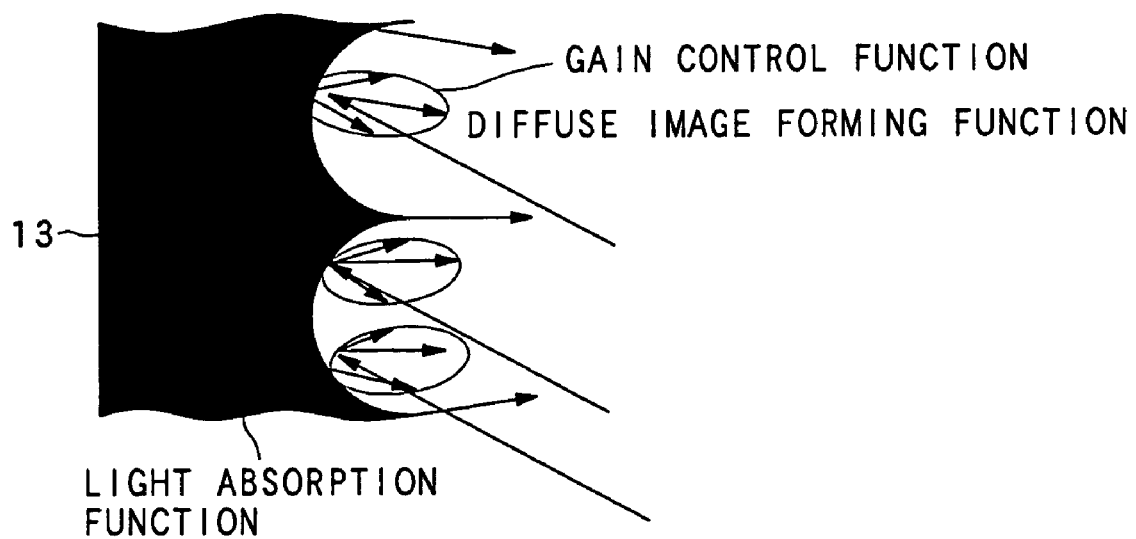
FIG. 14 is a schematic side sectional view showing the structure of essential parts of the screen for image display apparatus shown in FIG. 13.

Alternatively, in this screen for image display apparatus, as the front part of the black light absorption layer 13 having the light absorption function has a fine concave and convex surface (rough surface) and a lens structure is formed thereon, as shown in FIG. 13, the light control layer 18 constructed as a band-pass filter on the front side of the light absorption layer 13 is caused to follow the shape of the front part of the light absorption layer 13. This can realize the gain control function and the diffuse image forming function, as shown in FIG. 14, and can also realize the reflection wavelength selection function in the light control layer 18. In this screen for image display apparatus, the external light reduction function is realized by the external light reduction layer 19 made of an absorption polarizing plate.

Figure 15:
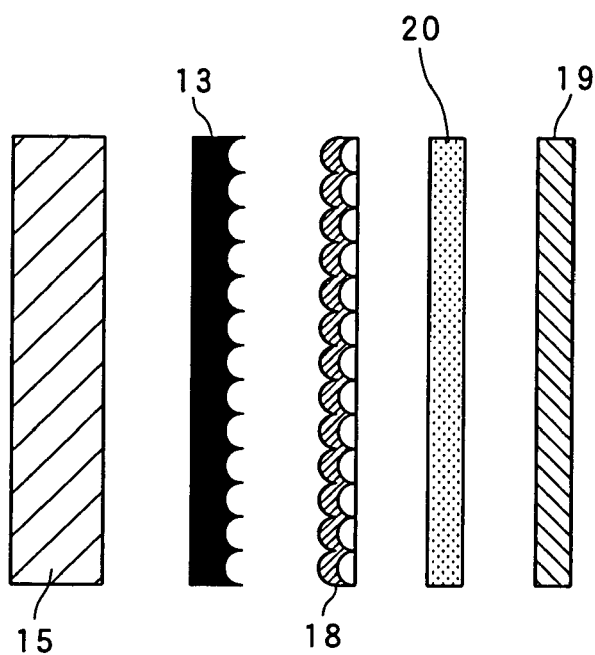
FIG. 15 is an exploded side sectional view showing a third exemplary structure of the screen for image display apparatus.

Alternatively, in this screen for image display apparatus, as a lens structure is formed on the front part of the black light absorption layer 13 having the light absorption function, as shown in FIG. 15, the light control layer 18 constructed as a band-ass filter on the front side of the light absorption layer 13 is caused to follow the shape of the front part of the light absorption layer 13, thus realizing the gain control function. Moreover, the reflection wavelength selection function in the light control layer 18 can be realized. The diffuse image forming function is realized by providing a diffusion plate 20 having a structure in which a diffuser made of particles of a different refractive index from that of a base material is dispersed, between the light control layer 18 and the external light reduction layer 19, which is an absorption polarizing plate having the external light reduction function.

Figure 16:
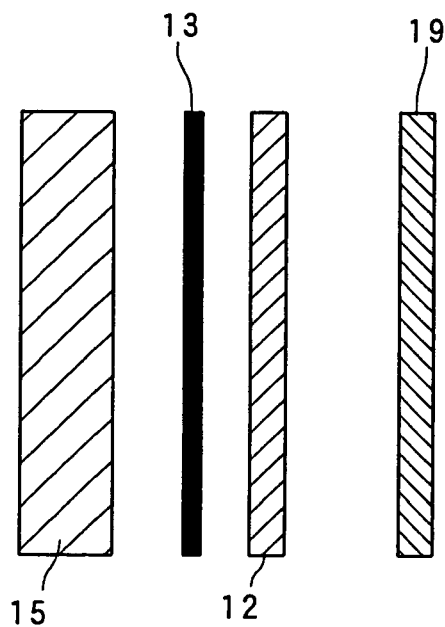
FIG. 16 is an exploded side sectional view showing a fourth exemplary structure of the screen for image display apparatus.
Figure 17:
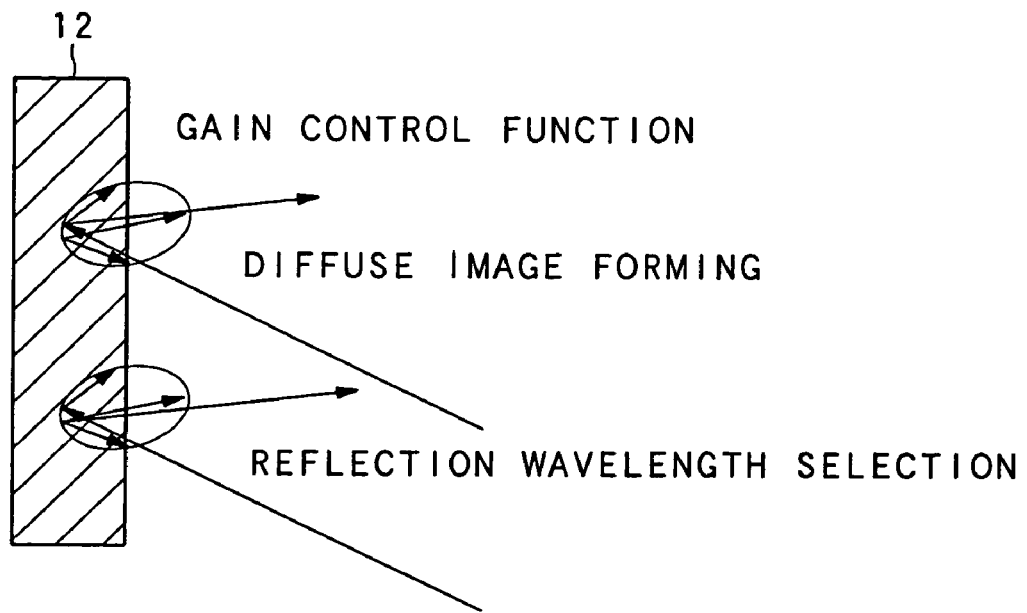
FIG. 17 is a schematic side sectional view showing the structure of essential parts of the screen for image display apparatus shown in FIG. 16.

Alternatively, in this screen for image display apparatus, the light absorption function is realized by the black light absorption layer 13, as shown in FIG. 16. The gain control function, the diffuse image forming function and the reflection wavelength selection function can be realized by a holographic material 12 to be the light control layer arranged on the front side of the light absorption layer 13, as shown in FIG. 17. A method for manufacturing the holographic material 12 having such functions will be described later. Moreover, in this screen for image display apparatus, the external light reduction function is realized by the external light reduction layer 19 made of an absorption polarizing plate.

Figure 18:
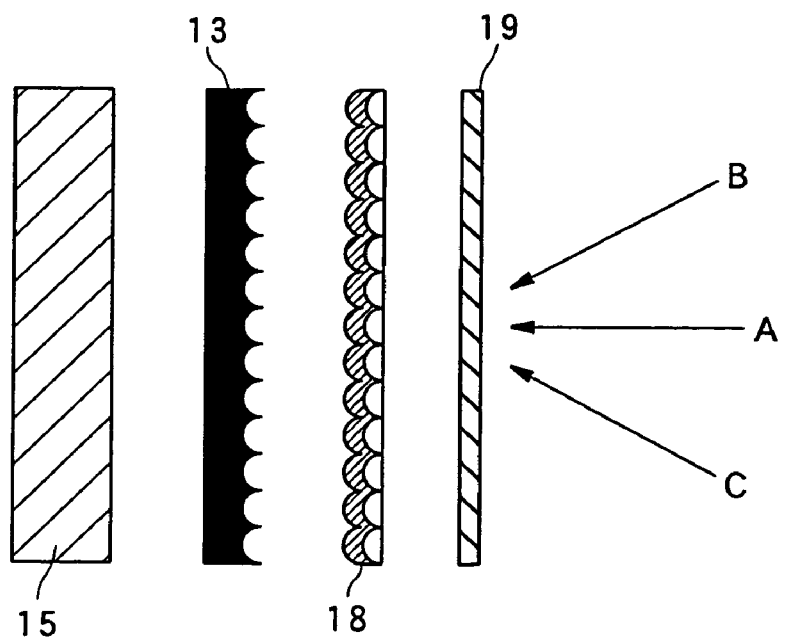
FIG. 18 is an exploded side sectional view showing a fifth exemplary structure of the screen for image display apparatus.

Alternatively, in the screen for image display apparatus, as shown in FIG. 18, the external light reduction function can be realized by the external light reduction layer 19 having the plural fine shade plates 19a that intercept and absorb light incident from an upper-front side and a lower-front side indicated by arrows B and C in FIG. 18 and transmit image display light indicated by an arrow A in FIG. 18. The structural parts of this screen for image display apparatus except for the external light reduction layer are similar to those of the screen for image display apparatus shown in FIG. 13.

In all the above-described structures of the screen for image display apparatus, the external light reduction function can be omitted depending on the application and environment of the screen for image display apparatus. Moreover, in all the above-described structures of the screen for image display apparatus, the surface part on the outermost front side may have a surface reflection prevention function. This surface reflection prevention function can be realized by forming fine convexes and concaves in the surface part on the outermost front side of the screen for image display apparatus.

[Method for Manufacturing Screen for Image Display Apparatus]

A method for manufacturing the screen for image display apparatus according to the present invention will now be described.

First, to construct the reflection layer as a multilayer thin film band-pass filter having the reflection wavelength selection function corresponding to the wavelength of image display light by generating Bragg reflection for image display light, in the light control layer, a dielectric material or the like forming the reflection layer is deposited in the form of a multilayer thin film on the front part of the support layer or the front part of the light absorption layer by an evaporation method or the like.

Figure 19:
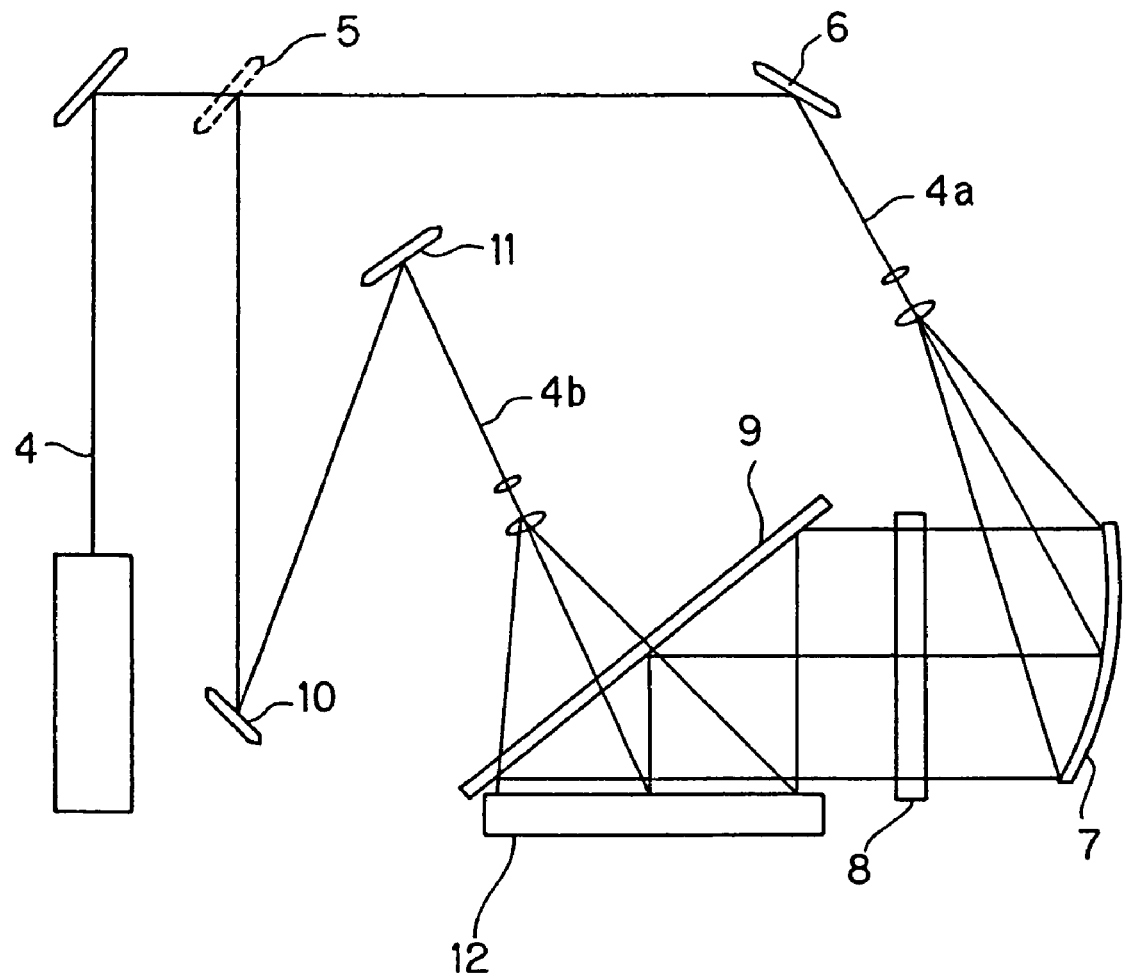
FIG. 19 is a side view showing the state of carrying out the method for manufacturing the screen according to the present invention, which is a process of manufacturing the image display apparatus in the case of manufacturing the screen for image display apparatus as a holographic screen.

Next, a manufacturing method that realizes the above-described reflection wavelength characteristic using the holographic material 12 as described above may be considered. Specifically, by preparing a reflective holographic screen using a laser beam 4 having the same wavelength characteristic or substantially the same wavelength characteristic as image display light projected via the projection image forming means, as object light 4a and reference light 4b, as shown in FIG. 19, it is possible to manufacture the screen that selectively reflects only the wavelength of image display light.

In the manufacture of the screen for image display apparatus constituted as such a reflective holographic screen, the laser beam 4 is split into two optical paths by a half mirror 5. The object light 4a, which is, one of the two optical paths, becomes incident on the holographic material 12 via plural mirrors 6, 7, 9 and a diffusion plate 8. The reference light 4b, which is, the other of the two optical path, becomes incident on the holographic material 12 via plural mirrors 10, 11. In this holographic material 12, the object light 4a and the reference light 4b interfere with each other and form interference fringes, and parts corresponding to the interference fringes are exposed to light. As such exposure is performed for primary colors and development is then performed, a reflective holographic screen having a diffraction grating corresponding to primary colors is formed.

Figure 20:
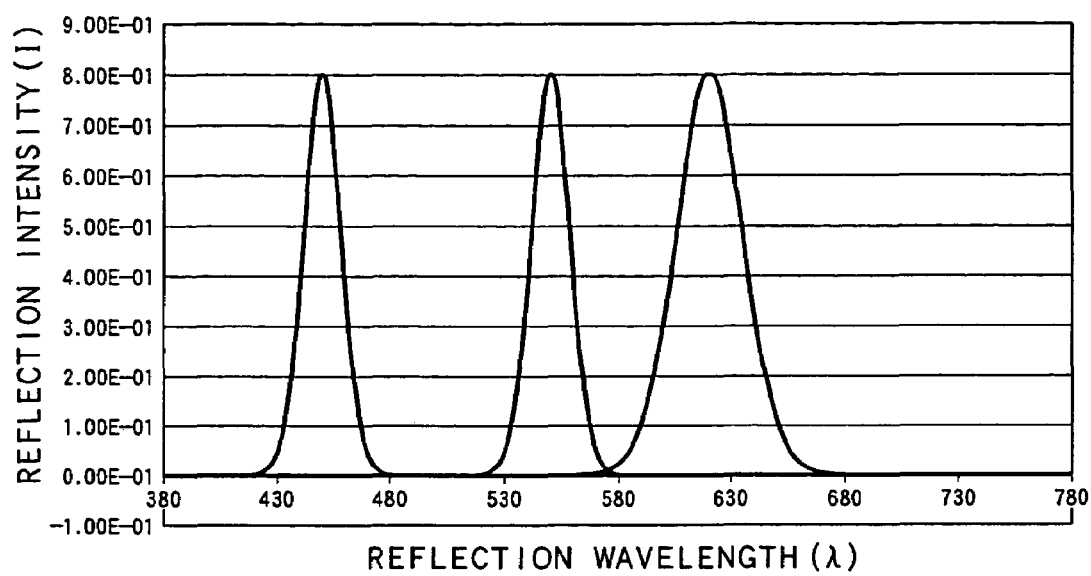
FIG. 20 is a graph showing an exemplary reflection wavelength characteristic of a holographic material.

An exemplary reflection wavelength characteristic of such a holographic material 12 is a high reflectance in wavelength ranges of R (red), G (green) and B (blue) and a reflectance of nearly 0 in the other wavelength ranges, as shown in FIG. 20.

In the screen for image display apparatus constituted by using such a holographic material 12, light having a wavelength λ others that is different from those of the object light 4a and the reference light 4b is not reflected by the holographic material 12 and is transmitted through the holographic material 12, as shown in FIG. 21. The light (with the wavelength λothers) transmitted through the holographic material 12 is absorbed by the light absorption layer 13 provided on the back side of the holographic material 12.

In the screen for image display apparatus constituted as a reflective holographic screen, light having the wavelengths of the object light 4a and the reference light 4b, that is, image display light having wavelengths λr, λg and λb projected via the projection image forming means, is reflected by the holographic material 12 and reaches the eyes of the observer 14.

Figure 22:
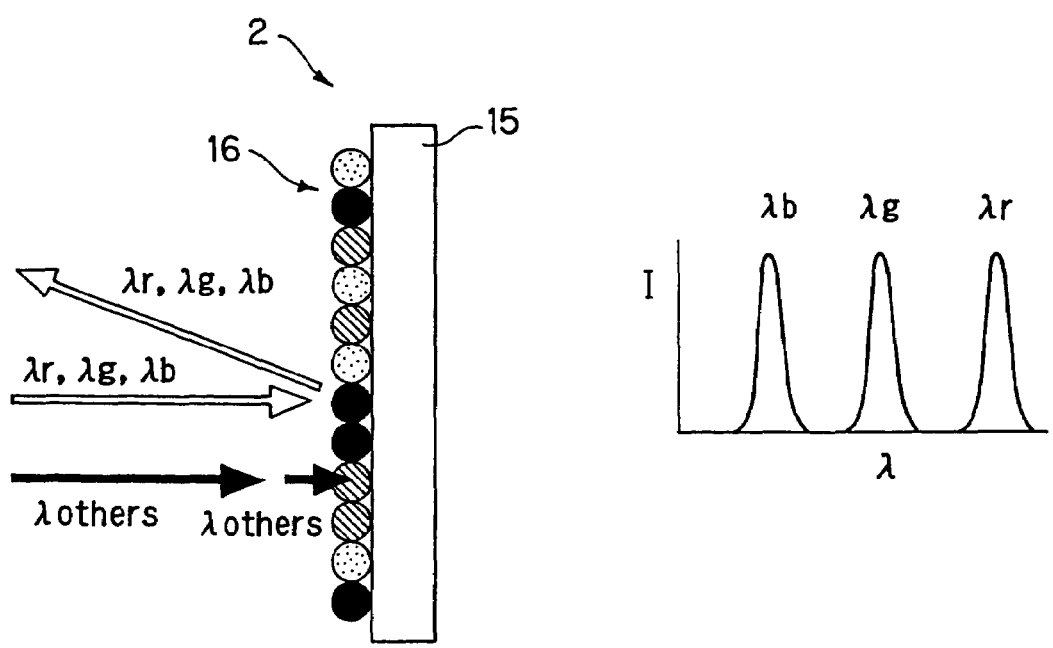
FIG. 22 is a side view showing an action of a screen having toner layers of plural colors in the image display apparatus.

As a method for manufacturing this screen for image display apparatus, a toner layer 16 formed by applying a preparation of plural types of toner (pigment) particles may be provided as the light control layer on the front part of base member 15 to be a projection surface, as shown in FIG. 22. This toner layer 16 is made of toner particles that reflect red (R), toner particles that reflect green (G) and toner particles that reflect blue (B). The toner layer 16 looks black when it is illuminated by peripheral light of the wavelength λothers that does not include primary colors.

Figure 23A:
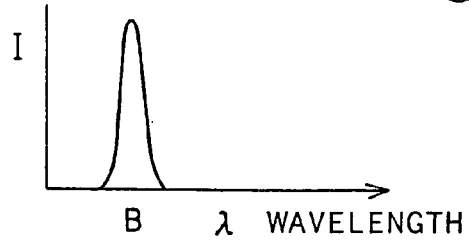
FIGS. 23A to 23C are graphs showing reflection wavelength characteristics of toner particles of plural colors constituting the screen in the image display apparatus.
Figure 23C:
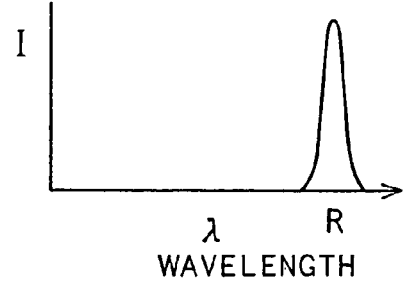
Figure 23B:
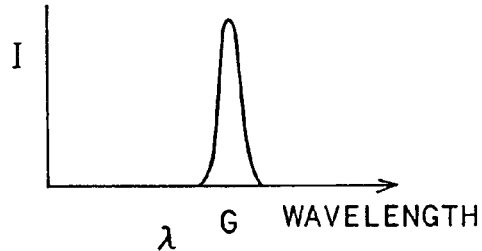

The toner particles that reflect blue (B) reflect only blue (B) and absorb light of the other wavelengths, as shown in FIG. 23A. The toner particles that reflect green (G) reflect only green (G) and absorb light of the other wavelengths, as shown in FIG. 23B. The toner particles that reflect red (R) reflect only red (R) and absorb light of the other wavelengths, as shown in FIG. 23C.

When image display light made up of primary colors (with wavelengths λr, λg, λb) is projected on the toner layer 16 via the projection image forming means, these color light beams are reflected by the toner particles of the corresponding colors and reach the eyes of the observer.

[Structure of Image Display Apparatus]

Figure 24:
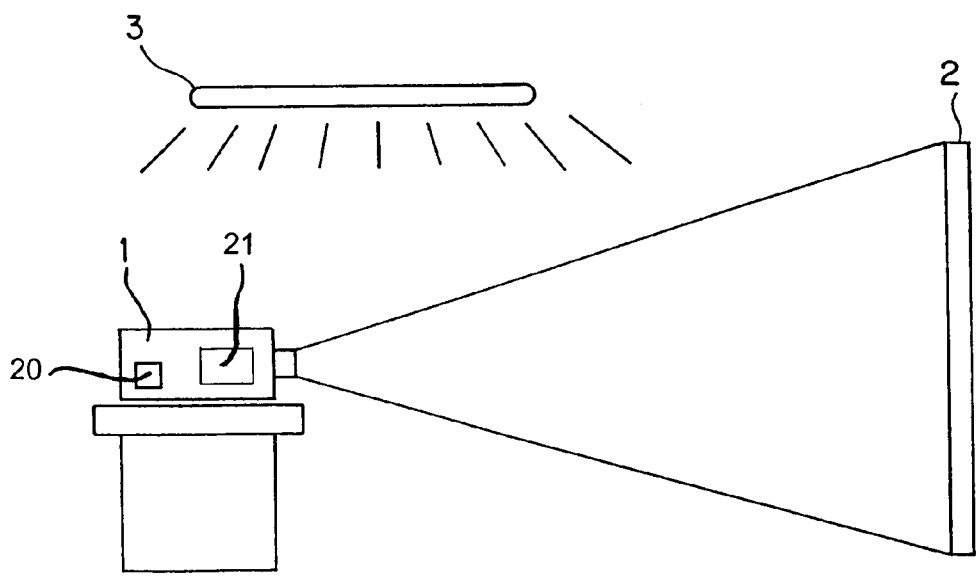
FIG. 24 is a side view showing the structure of an image display apparatus according to the present invention.

An image display apparatus according to the present invention has three elements, that is, a projector 1 having projection image forming means for projecting image light, a screen for image display apparatus 2 on which the projector 1 projects an image, and a light 3, which is peripheral light generating means for illuminating the screen for image display apparatus 2 and its periphery, as shown in FIG. 24.

In this image display apparatus, the screen for image display apparatus 2 is the above-described screen for image display apparatus according to the present invention. Therefore, the screen for image display apparatus 2 in this image display apparatus can employ any of the above-described exemplary structures of the screen image display apparatus.

The projector 1 has a light source 20 for emitting primary-color light beams of red, green and blue, a spatial light modulator 21 (light bulb) for modulating the intensity of the light beam of each color emitted from the light source in accordance with image information, and projection image forming means (projection lens) for superimposing the primary-color light beams with their intensities modulated by the spatial light modulator 21 so as to form an image on the screen for image display apparatus 2. As the spatial light modulator 21, a reflective or transmission type liquid crystal modulator, or a switching element such as a micro-mirror array can be used.

That is, the projector 1 projects a red-component image of an image to be displayed on the screen for image display apparatus 2 with red light, projects a green-component image of the image to be displayed on the screen for image display apparatus 2 with green light, and projects a blue-component image of the image to be displayed on the screen for image display apparatus 2 with blue light. The projector 1 then superimposes these light beams, thus reproducing the original display image.

Figure 25:
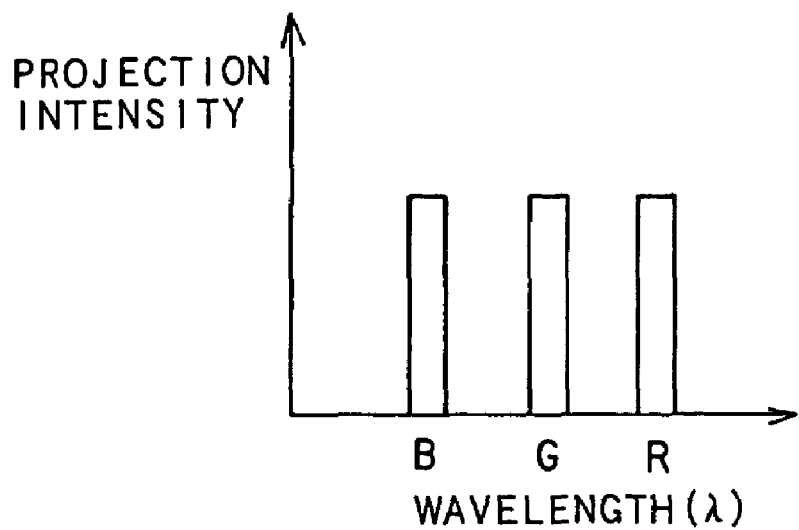
FIG. 25 is a graph showing a wavelength characteristic of projected light from a projector of the image display apparatus.

The wavelength components of the light beams projected by the projector 1 are those of primary-color light of red (R), green (G) and blue (B), as shown in FIG. 25. (The horizontal axis represents wavelength λ and the vertical axis represents projection intensity.)

Figure 26:
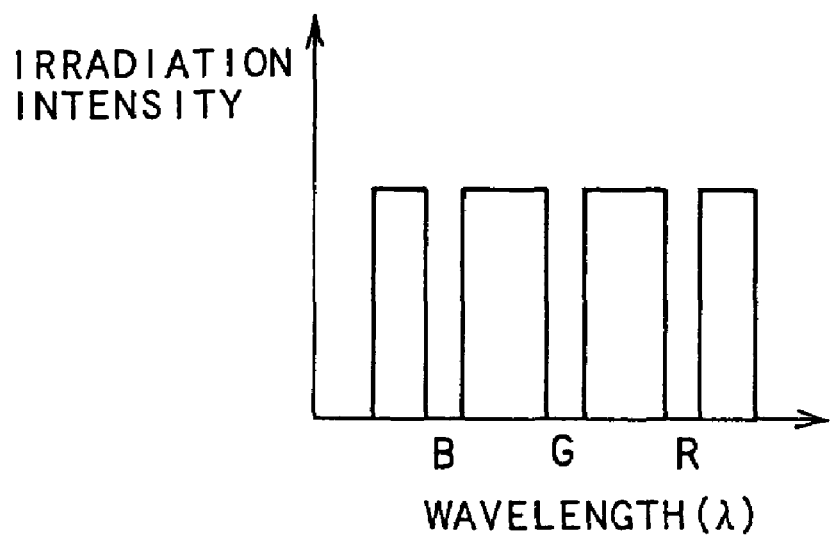
FIG. 26 is a graph showing a wavelength characteristic of peripheral light in the image display apparatus.
Figure 27:
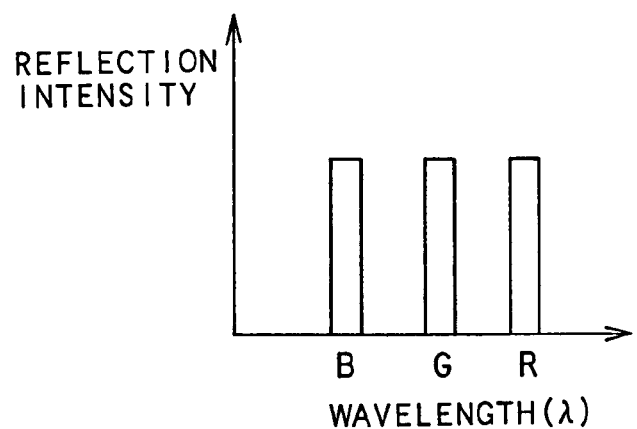
FIG. 27 is a graph showing a reflection wavelength characteristic of a screen in the image display apparatus.

The light 3 illuminates the screen for image display apparatus 2, using peripheral light having a wavelength different from those of the primary-color light beams, as shown in FIG. 26. (The horizontal axis represents wavelength λ and the vertical axis represents irradiation intensity.) The screen for image display apparatus 2 has a higher reflectance for the primary-color light projected from the projector 1 than for the peripheral light and has a lower absorptivity for the primary-color light than for the peripheral light, as shown in FIG. 27. (The horizontal axis represents wavelength λ and the vertical axis represents reflection intensity.)

Figure 28:
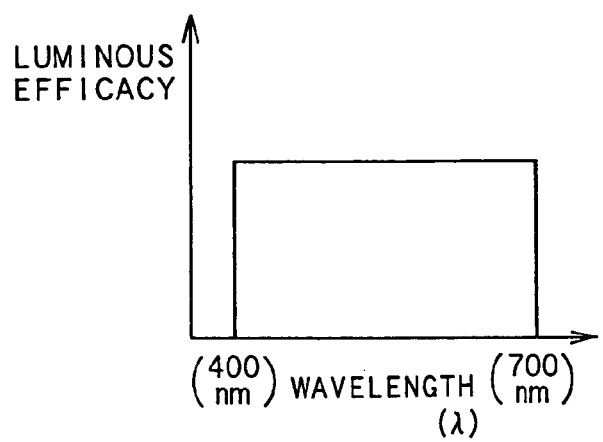
FIG. 28 is a graph showing a reflection wavelength characteristic with respect to luminous efficacy for a person enjoying an image display by the image display apparatus.

As will be described later, this image display apparatus can display a highly visible image even in a bright environment. That is, the human visual characteristic (visible wavelength characteristic) shows substantially uniform luminous efficacy in a so-called visible light range (wavelengths of approximately 400 to 700 nm), as shown in FIG. 28.

Therefore, the light projected on the screen for image display apparatus 2 from the projector 1 is reflected by the screen for image display apparatus 2 and reaches the eyes of the viewer, but all of excess light including the peripheral light on the screen for image display apparatus 2 is absorbed by this screen for image display apparatus 2. Therefore, on the screen for image display apparatus 2, only the image projected by the projector 1 is visible to the eyes of the viewer as an image.

[Light Source of Projector]

Figure 29:
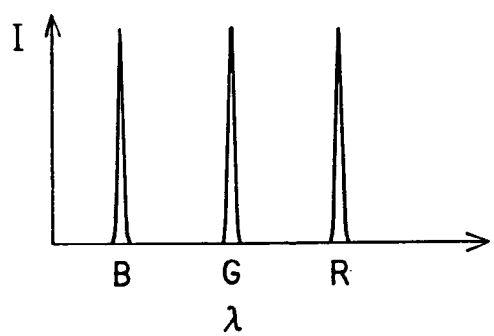
FIG. 29 is a graph showing a wavelength characteristic of projected light from the projector in the case the projector of the image display apparatus has a laser light source.

The primary-color light beams projected by the projector 1 can be easily discriminated from peripheral light if the wavelength width of each of the primary-color light beams is made as narrow as possible. That is, as a laser light source is used as the light source of the projector 1, the wavelength width of each of the primary-color light beams can be extremely narrowed, as shown in FIG. 29. In this case, the projector 1 has scanning means and causes this scanning means to scan the image display range in the direction of irradiation of a laser beam emitted from the laser light source. As the spatial light modulator, light intensity control means for changing the intensity of the laser beam in accordance with the timing of scanning in the direction of irradiation of the laser beam by the scanning means can be used.

Since the narrowing of the wavelength width of the primary-color light using the laser light source enables easy reduction of the range overlapping the wavelength of peripheral light, the design freedom increases and the properties of the projector can improved.

Figure 30A:
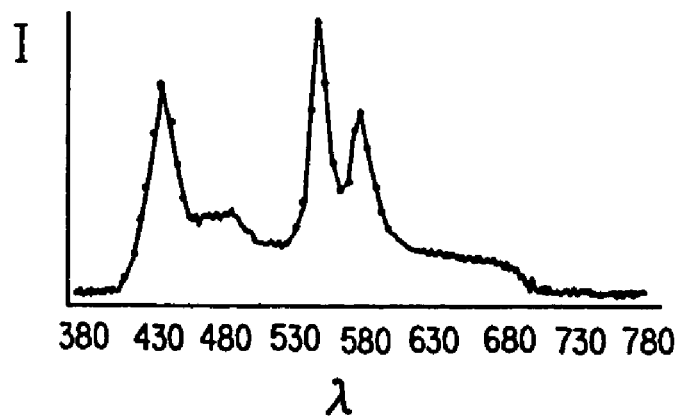
FIG. 30A is a graph showing an emission wavelength characteristic of a high-pressure mercury lamp as a light source of the projector of the image display apparatus.
Figure 30B:
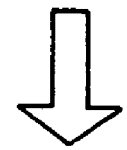
FIG. 30B is a graph showing a wavelength characteristic in the case light from the high-pressure mercury lamp is filtered and used as projected light from the projector.
Figure 30B:
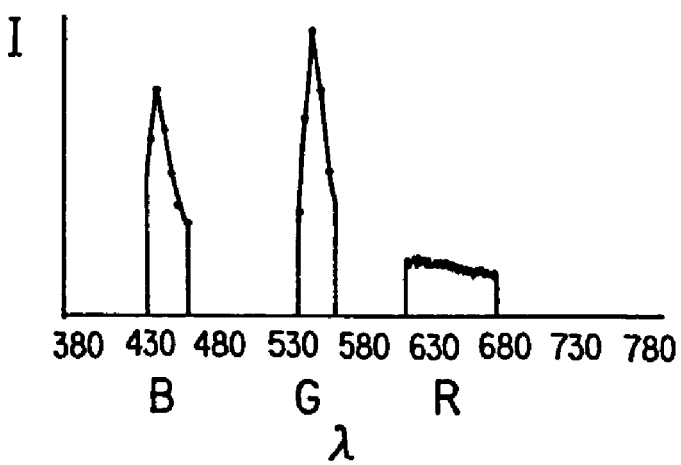

Alternatively, in the projector 1 of this image display apparatus, a discharge tube such as a metal halide lamp, a high-pressure mercury lamp or a xenon lamp can be used as the light source. Light emitted by a high-pressure mercury lamp has a clear emission line spectrum but includes wavelength components other than this emission line spectrum, as shown in FIG. 30A. Therefore, if the light is filtered by a filter that transmits only specific wavelengths, only light of specific wavelength components can be provided, as shown in FIG. 30B.

When a xenon lamp is used, since emitted light has a broad wavelength characteristic, it is necessary to control the wavelength characteristic of the projected light by complex filtering with a combination of filters having different wavelength characteristics. A such filtering is performed, primary-color light with sufficiently narrow wavelength widths can be provided.

Figure 31A:
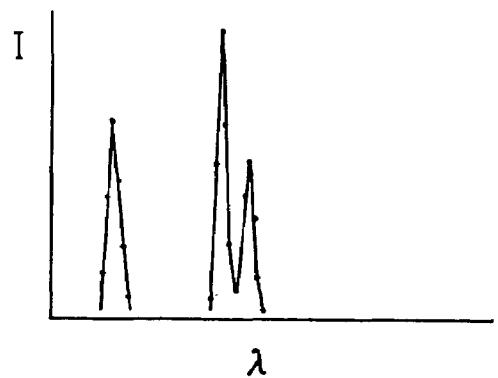
FIG. 31A is a graph showing an emission wavelength characteristic of a medium-pressure mercury lamp as a light source of the projector of the image display apparatus.
Figure 31B:
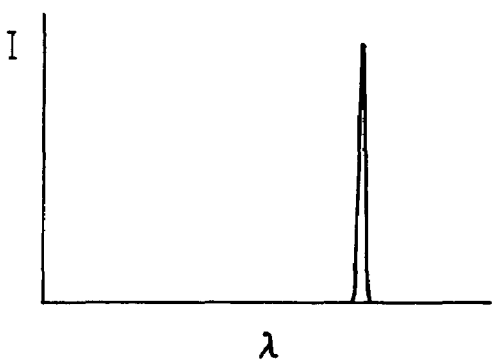
FIG. 31B is a graph showing a wavelength characteristic of light from a red semiconductor laser.
Figure 31C:
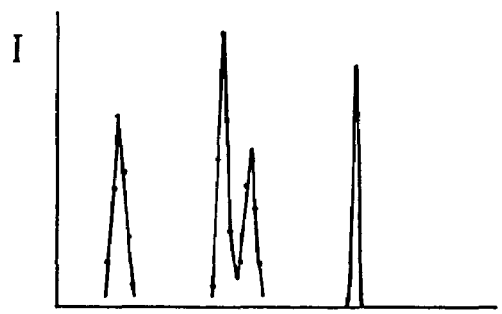
FIG. 31C is a graph showing a wavelength characteristic in the case light from the medium-pressure mercury lamp and light from the red semiconductor laser are superposed and used as projected light from the projector.

Alternatively, if a hybrid light source constituted by a relatively low-pressure mercury lamp (medium-pressure mercury lamp) and a red semiconductor laser is used as the light source of the projector 1, emission line peaks of blue and green of the mercury lamp shown in FIG. 31A and a spectrum having a narrow wavelength width of the red laser shown in FIG. 31B can be used to provide primary-color light with narrow wavelength width as shown in FIG. 31C without filtering.

[Light (Peripheral Light Generating Means)]

Figure 32:
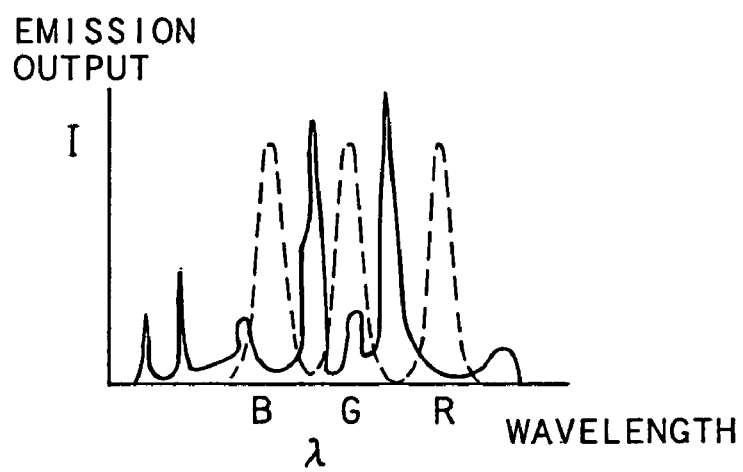
FIG. 32 is a graph showing an emission wavelength characteristic of a fluorescent lamp as peripheral light generating means in the image display apparatus.

As the light 3, which is peripheral light generating means, a warm-white fluorescent lamp using a suitably prepared a fluorescent material so that its emission wavelength characteristic does not overlap the the wavelength of the light projected by the projector 1 can be used, as shown in FIG. 32.

Figure 33A:
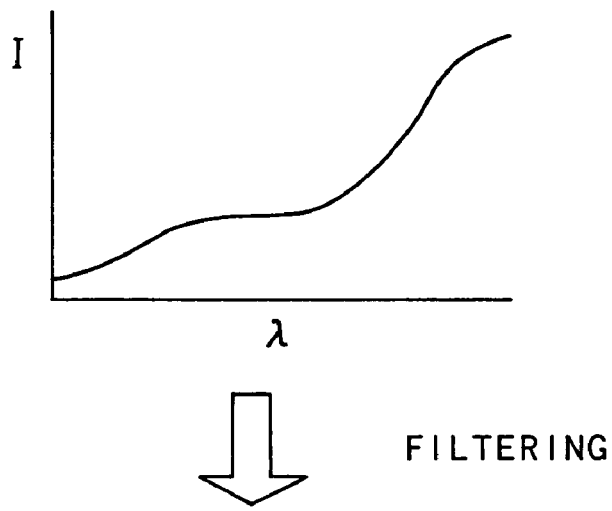
FIG. 33A is a graph showing an emission wavelength characteristic of an incandescent lamp as peripheral light generating means in the image display apparatus.
Figure 33B:
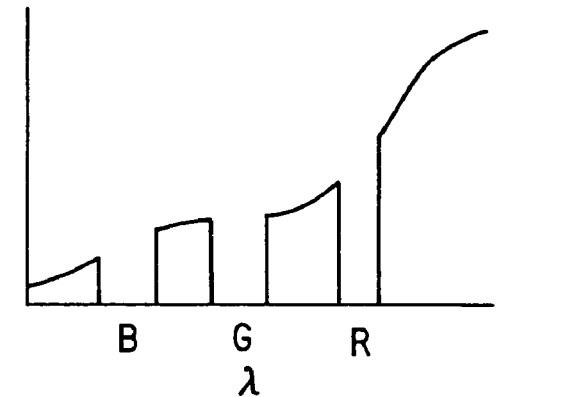
FIG. 33B is a graph showing a wavelength characteristic of light obtained by filtering light from the incandescent lamp.

As the light 3, a combination of an illuminating light source such as an incandescent lamp and a filter for cutting off the wavelength ranges of the primary-color light beams of light from this illuminating light source can also be used. Light from the illuminating light source such as an incandescent lamp has a broad wavelength characteristic extending substantially over an entire visible light range, as shown in FIG. 33A. However, as this light is filtered, it becomes light having a wavelength characteristic from which the wavelength ranges of the primary-color light beams have been cut off, as shown in FIG. 33B.

To provide the light 3, an ordinarily used fluorescent lamp or incandescent lamp can be replaced by a warm-white fluorescent lamp using a suitably prepared fluorescent material or an incandescent lamp combined with a filter as described above.

Figure 34:
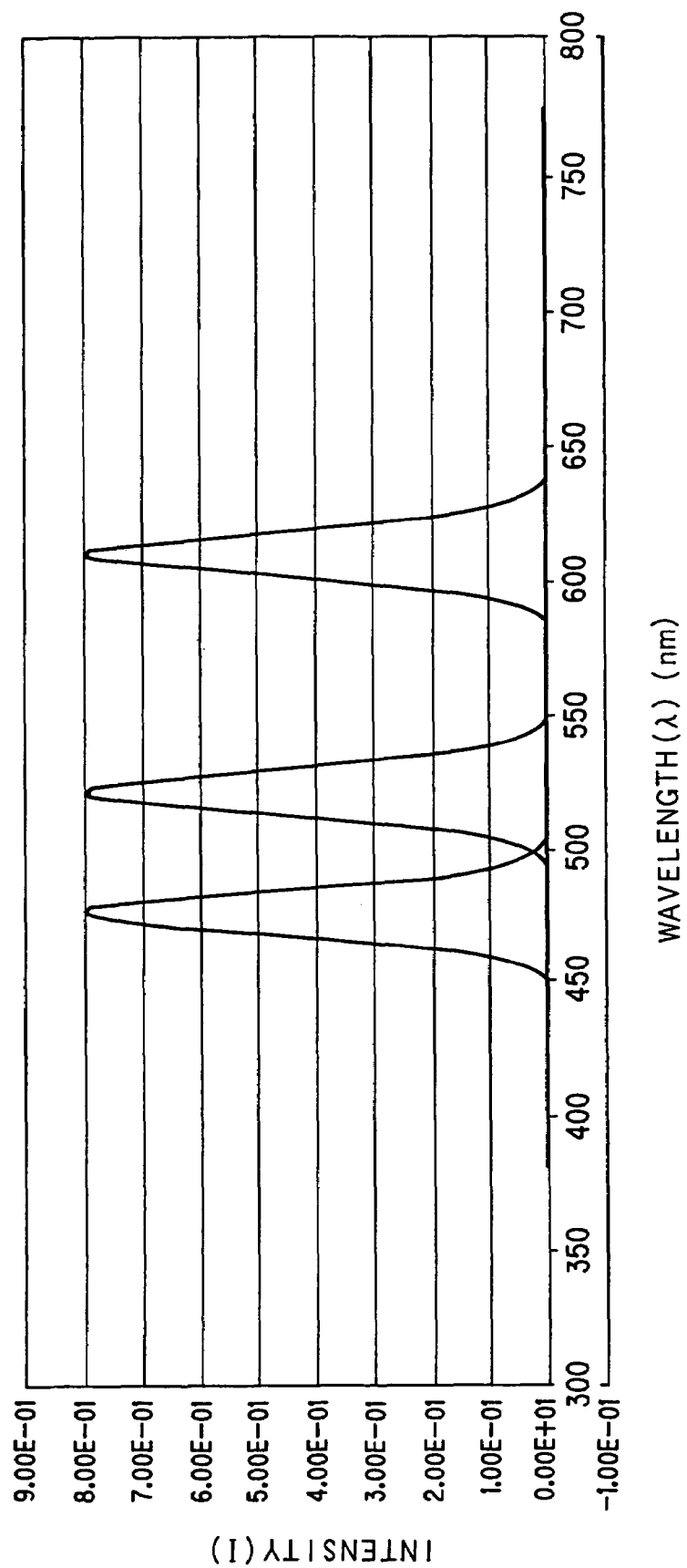
FIG. 34 is a graph showing an emission wavelength characteristic of a light-emitting diode as peripheral light generating means in the image display apparatus.

The peripheral light generating means can also be constituted using a light-emitting diode (LED). In this case, the light-emitting diode has an emission wavelength characteristic that is different from the color reproducing wavelength in the light source, the spatial light modulator and the projection image forming means of the projector 1, and emits peripheral light having a wavelength that does not overlap the wavelength of the light projected by the projector 1, as shown in FIG. 34. A combination of plural types of light-emitting diodes may be used. To the human eyes, the peripheral light looks substantially white.

Figure 35:
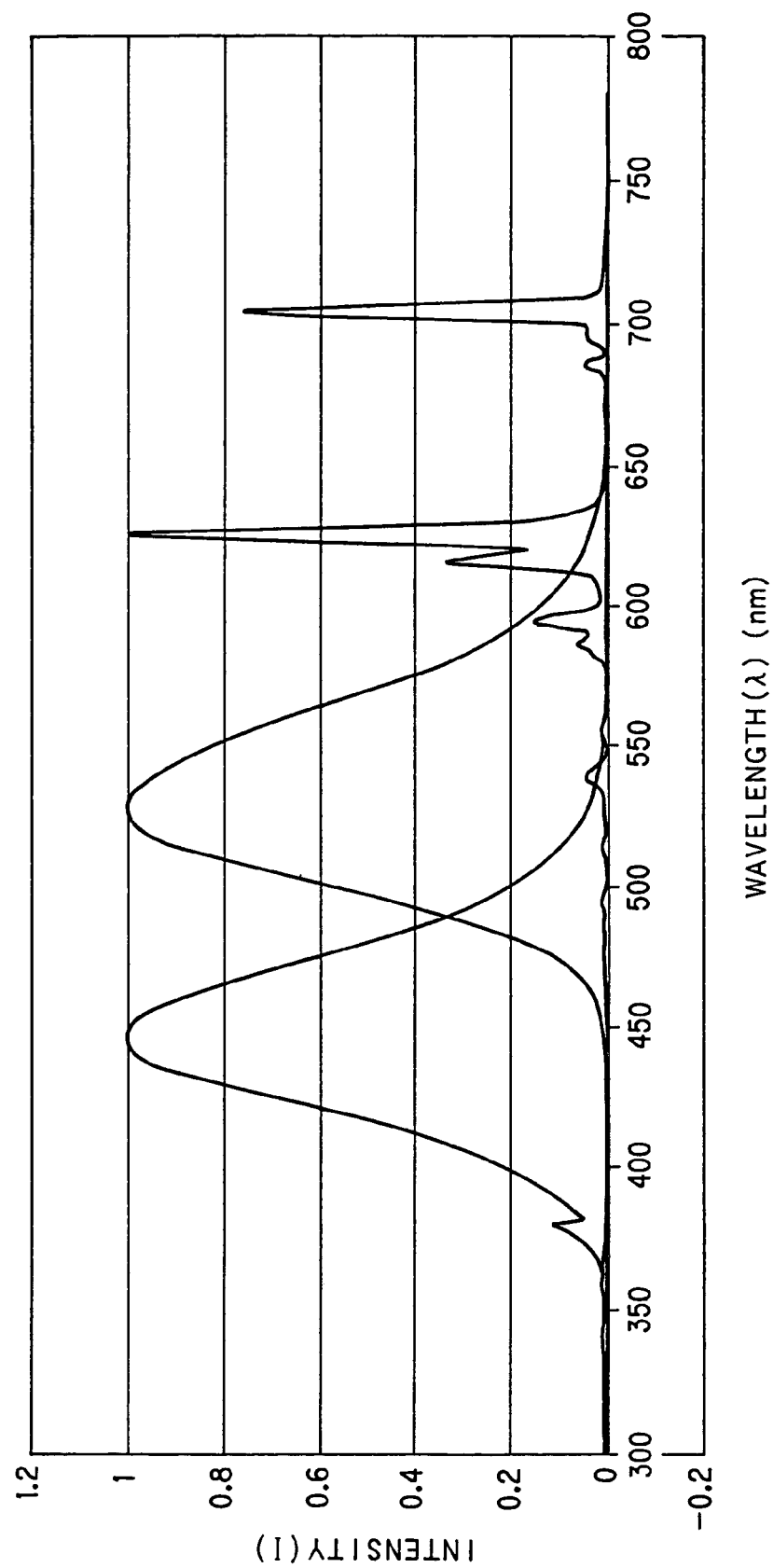
FIG. 35 is a graph showing an emission wavelength characteristic of a visible phosphor as peripheral light generating means in the image display apparatus.

The peripheral light generating means can also be constituted by an ultraviolet light-emitting diode (LED), and a visible phosphor excited by an ultraviolet ray emitted by the ultraviolet light-emitting diode. In this case, the visible phosphor has an emission wavelength characteristic that is different from the color reproducing wavelength in the light source, the spatial light modulator and the projection image forming means of the projector 1, and emits peripheral light having a wavelength that does not overlap the wavelength of the light projected by the projector 1, as shown in FIG. 35. A combination of plural types of light-emitting diodes or visible phosphors can be used. To the human eyes, the peripheral light looks substantially white.

[Structure Using Ultraviolet Ray]

Figure 36:
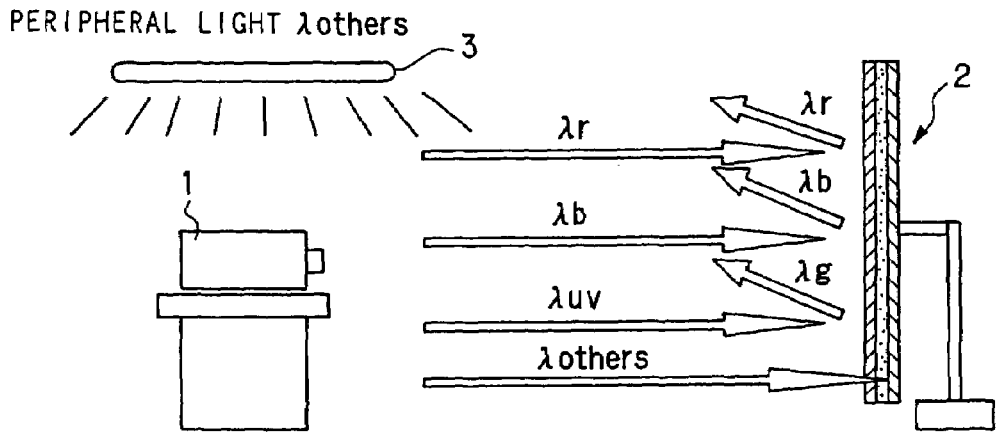
FIG. 36 is a side view showing the structure of an image display apparatus in which one of primary colors is replaced by an ultraviolet ray.
Figure 37:
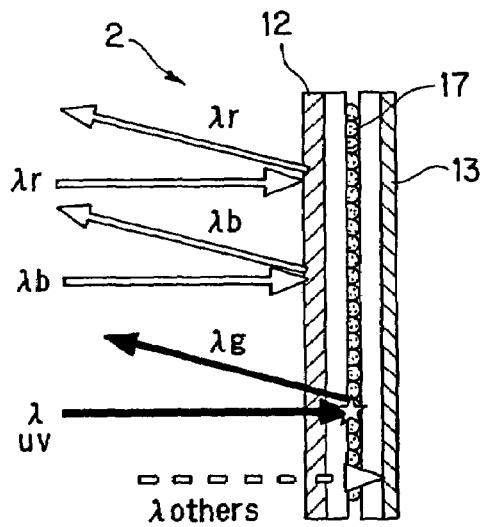
FIG. 37 is a side view showing an action of a screen in the image display apparatus shown in FIG. 36.

Moreover, in the image display apparatus according to the present invention, one of the primary-color light beams to be projected onto the screen for image display apparatus 2 may be replaced by an ultraviolet ray in the projector 1, and a color conversion layer (phosphor layer) for converting the ultraviolet ray to the one primary-color light beam that have been replaced by the ultraviolet ray in the projector 1 may be provided in the screen for image display apparatus 2, as shown in FIG. 36. Specifically, in this image display apparatus, the projector 1 projects two primary-color light beams (with wavelengths $\lambda r$, $\lambda b$) of the three primary-color light beams and an ultraviolet ray (with a wavelength $\lambda uv$) onto the screen for image display apparatus 2. The two primary-color light beams (with wavelengths $\lambda r$, $\lambda b$) projected on the screen are reflected by the holographic material 12 formed on the front side of the screen for image display apparatus 2 as described above, as shown in FIG. 37. The ultraviolet ray (with a wavelength $\lambda uv$) projected on the screen for image display apparatus 2 is transmitted through the holographic material 12, then converted to the remaining one primary-color light beam (with a wavelength $\lambda g$) in a phosphor layer 17 formed behind the holographic material 12, then reflected, and transmitted through the holographic material 12 again. Peripheral light (with a wavelength $\lambda others$) from the light 3 is transmitted through the holographic material 12 and the phosphor layer 17, and absorbed by the light absorption layer 13 provided on the back side of the screen for image display apparatus 2. That is, the screen for image display apparatus 2 of this case includes a composite of the holographic material 12, the phosphor layer 17 and the light absorption layer 13.

Figure 38A:
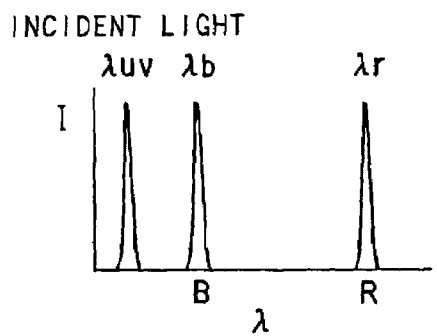
FIG. 38A is a graph showing a wavelength characteristic of light projected on a screen in the image display apparatus shown in FIG. 36.
Figure 38B:
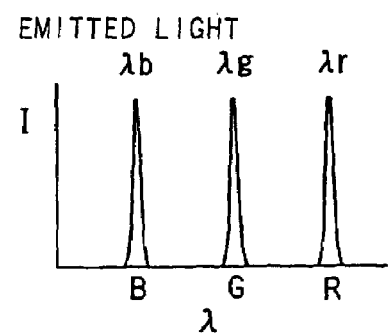
FIG. 38B is a graph showing a wavelength characteristic of light reflected by the screen.

In this image display apparatus, when the two primary-color light beams (with wavelengths $\lambda r$, $\lambda b$) and the ultraviolet ray (with a wavelength $\lambda uv$) projected from the projector 1 are reflected by the screen for image display apparatus 2, as shown in FIG. 38A, the light beams become three primary-color light beams (with wavelengths $\lambda r$, $\lambda g$, $\lambda b$), thus performing image display.

[Specific Wavelength Characteristics]

With respect to the wavelength characteristic of projected light from the projector 1, the wavelength characteristic of reflectance in the screen for image display apparatus 2 and the wavelength characteristic of peripheral light in the image display apparatus having a suitable combination of the projector 1, the screen for image display apparatus 2 and the light 3 selected from the above-described various structures, specific examples will now be described.

Figure 39D:
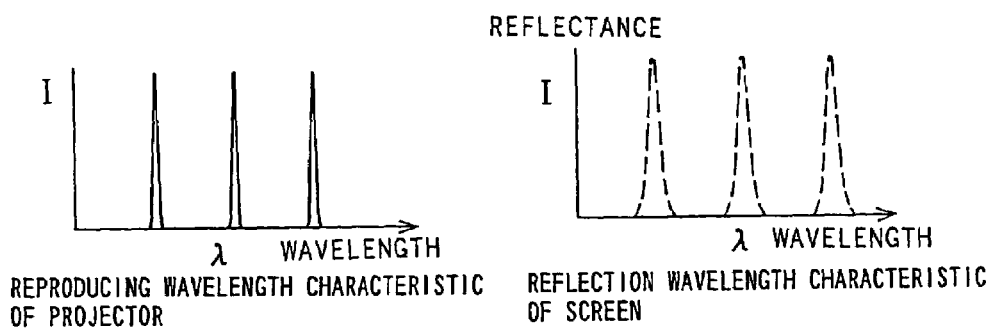
FIG. 39D is a graph showing wavelength characteristics of projected light and peripheral light on the screen.
Figure 39D:
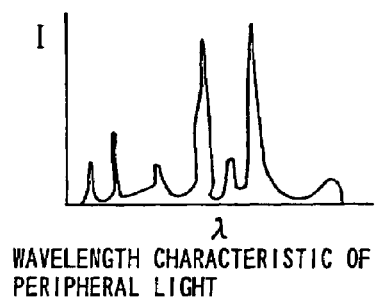
Figure 39D:
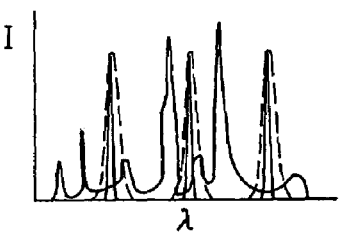

First, if a laser display having a laser light source as its light source is used as the projector, light projected from this projector is primary-color light having acute peaks at wavelengths of 457 nm (B), 532 nm (G) and 647 nm (R), as shown in FIG. 39A. A reflective holographic screen is used as the screen and the wavelength characteristic of reflected light from this screen is made coincident with that of the primary-color light projected from the projector 1, as shown in FIG. 39B. A warm-white fluorescent lamp is used as the light for emitting peripheral light, and this lamp is caused to generate peripheral light of a wavelength characteristic having peaks in wavelength ranges other than those of the primary-color light, as shown in FIG. 39C. When the projector projects an image on the screen and the peripheral light illuminates the screen and its periphery, the peripheral light on the screen is absorbed by the screen and only the light for performing image display projected from the projector is reflected by the screen, as shown in FIG. 39D.

Figure 40D:
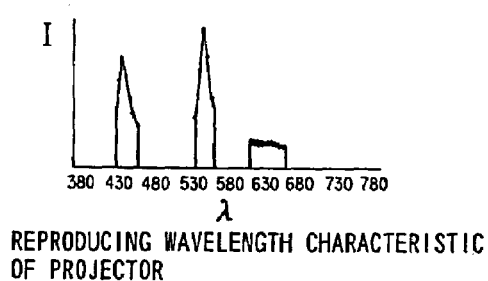
FIG. 40D is a graph showing wavelength characteristics of projected light and peripheral light on the screen.
Figure 40D:
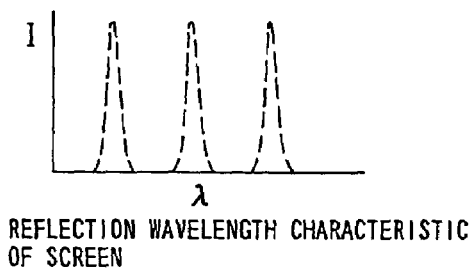
Figure 40D:
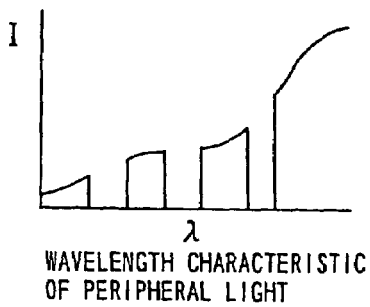
Figure 40D:
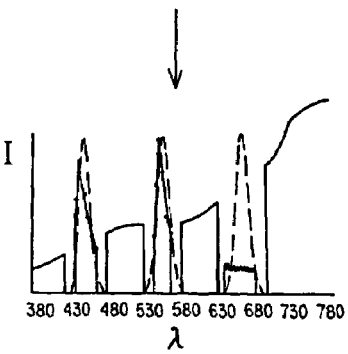

Next, if a filtered metal halide lamp is used as the light source of the projector, light projected from this projector is primary-color light having peaks at around wavelengths of 440 nm (B), 532 nm (G) and 647 nm (R), as shown in FIG. 40A. A reflective holographic screen is used as the screen and the wavelength characteristic of reflected light from this screen is made coincide with that of the primary-color light projected form the projector 1, as shown in FIG. 40B. A filtered incandescent lamp is used as the light for emitting peripheral light, and this lamp is caused to generate peripheral light of a wavelength characteristic from which the wavelength ranges of the primary-color light beams have been cut off, as shown in FIG. 40C. When the projector projects an image on the screen and the peripheral light illuminates the screen and its periphery, the peripheral light on the screen is absorbed by the screen and only the light for performing image display projected from the projector is reflected by the screen, as shown in FIG. 40D.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A screen for image display apparatus comprising:
   a base member;
   a light absorption layer formed on the base member and adapted for absorbing light of a wavelength range covering substantially an entire visible light range; and
   a light control layer formed on the light absorption layer;
   the light control layer having a diffuse image forming function of causing diffuse reflection of image display light projected via projection image forming means and thus forming an image, and a reflection wavelength selection function of selectively reflecting light of the wavelength range of the image display light and transmitting light of the other wavelength ranges.

2. The screen for image display apparatus as claimed in claim 1, wherein the light control layer has fine convexes and concaves or a micro-mirror formed in its surface part.

3. The screen for image display apparatus as claimed in claim 1, wherein the light control layer has the diffuse image forming function by having a fine diffuser of a different refractive index dispersed in the layer.

4. The screen for image display apparatus as claimed in claim 1, wherein the light control layer has the reflection wavelength selection function by being formed as a multi-layer thin film band-pass filter using a Bragg reflection film.

5. The screen for image display apparatus as claimed in claim 1, wherein the light control layer has the reflection wavelength selection function by having a holographic reflection film, and is formed as a reflective holographic screen.

6. The screen for image display apparatus as claimed in claim 1, wherein the light control layer has the reflection wavelength selection function by having its surface part coated with a mixture of first toner particles having a higher reflectance for light of a red wavelength range than for light of the other wavelength ranges, second toner particles having a higher reflectance for light of a green wavelength range than for light of the other wavelength ranges, and third toner particles having a higher reflectance for light of a blue wavelength range than for light of the other wavelength ranges.

7. The screen for image display apparatus as claimed in claim 1, wherein the light control layer has a gain control function of varying the quantity of reflected light with respect to incident light, depending on an exit direction of the reflected light.

8. The screen for image display apparatus as claimed in claim 7, wherein the light control layer has a lens effect by having plural fine concave parts in its surface part, thereby having the gain control function.

9. The screen for image display apparatus as claimed in claim 7, wherein the base member has plural fine concave parts in its surface part, and the light control layer has a shape following the shape of the surface of the base member and has a lens effect, thereby having the gain control function.

10. The screen for image display apparatus as claimed in claim 1, further comprising an external light reduction layer on the light control layer, the external light reduction layer being adapted for transmitting light of a wavelength range of image display light projected via the projection image forming means and for absorbing light of other wavelength ranges.

11. The screen for image display apparatus as claimed in claim 1, further comprising an external light reduction layer on the light control layer, the external light reduction layer having plural fine shade plates for transmitting light in a direction of incidence of image display light projected via the projection image forming means and for intercepting incident light in other directions.

12. The screen for image display apparatus as claimed in claim 1, further comprising an external light reduction layer on the light control layer, the external light reduction layer being adapted for transmitting light in a state of polarization of image display light projected via the projection image forming means and for absorbing light in other states of polarization.

13. A method for manufacturing a screen for image display apparatus, the method comprising applying a material prepared by mixing plural types of toner particles onto a projection surface, thus providing a reflection wavelength characteristic corresponding to a color reproducing wavelength of an image projector.

14. An image display apparatus comprising:
   a light source for emitting primary-color light of red, green and blue;
   a spatial light modulator for modulating the intensity of the light beam emitted from the light source in accordance with image information;
   projection image forming means for causing image formation on a screen, of the primary-color light with its intensity modulated by the spatial light modulator; and
   peripheral light generating means for illuminating the screen with peripheral light having a wavelength different from the wavelength of the primary-color light;

wherein the screen has a higher reflectance for the primary-color light than for the peripheral light and a lower absorptivity for the primary-color light than for the peripheral light.

15. The image display apparatus as claimed in claim 14, wherein the light source is a laser light source,
and wherein the projection image forming means scans a direction of irradiation of a laser beam emitted from the laser light source over an image display range, and
the spatial light modulator is light intensity control means for changing light intensity of the laser beam, corresponding to timing of scanning in the direction of irradiation of the laser beam.

16. The image display apparatus as claimed in claim 14, wherein the light source is a laser light source,
and wherein the projection image forming means scans a direction of irradiation of a laser beam emitted from the laser light source over an image display range, and
the spatial light modulator is a switching element for changing light intensity on the screen, of the laser beam with the direction of irradiation.

17. The image display apparatus as claimed in claim 16, wherein the spatial light modulator is a liquid crystal modulator.

18. The image display apparatus as claimed in claim 16, wherein the switching element is a micro-mirror array.

19. The image display apparatus as claimed in claim 14, wherein the light source is a discharge tube, and
the spatial light modulator is a switching element for changing light intensity on the screen, of the light beam passed through the filtering means.

20. The image display apparatus as claimed in claim 19, wherein the spatial light modulator is a liquid crystal modulator.

21. The image display apparatus as claimed in claim 19, wherein the switching element is a micro-mirror array.

22. The image display apparatus as claimed in claim 19, wherein the discharge tube, emits a red laser beam.

23. The image display apparatus as claimed in claim 22, wherein the spatial light modulator is a liquid crystal modulator.

24. The image display apparatus as claimed in claim 22, wherein the switching element is a micro-mirror array.

25. The image display apparatus as claimed in claim 22, wherein the discharge tube is a metal halide lamp, a high-pressure mercury lamp, or a xenon lamp.

26. The image display apparatus as claimed in claim 14, wherein the screen is a reflective holographic screen having a reflection wavelength characteristic corresponding to a color reproducing wavelength in the light source, the spatial light modulator and the projection image forming means.

27. The image display apparatus as claimed in claim 14, wherein the screen has its projection surface coated with a material prepared by mixing plural types of toner particles, thereby having a reflection wavelength characteristic corresponding to a color reproducing wavelength in the light source, the spatial light modulator and the projection image forming means.

28. The image display apparatus as claimed in claim 14, wherein the screen comprises a base member, a light absorption layer formed on the base member and adapted for absorbing light of a wavelength range covering substantially an entire visible light range, and a light control layer formed on the light absorption layer, and
the light control layer has a diffuse image forming function of causing diffuse reflection of primary-color light projected via the projection image forming means and thus forming an image, and a reflection wavelength selection function of selectively reflecting light of the wavelength range of the primary-color light and transmitting light of the other wavelength ranges.

29. The image display apparatus as claimed in claim 28, wherein the light control layer has fine convexes and concaves or a micro-mirror formed in its surface part.

30. The image display apparatus as claimed in claim 28, wherein the light control layer has the diffuse image forming function by having a fine diffuser of a different refractive index dispersed in the layer.

31. The image display apparatus as claimed in claim 28, wherein the light control layer has the reflection wavelength selection function by being formed as a multilayer thin film band-pass filter using a Bragg reflection film.

32. The image display apparatus as claimed in claim 28, wherein the light control layer has the reflection wavelength selection function by having a holographic reflection film, and is formed as a reflective holographic screen.

33. The image display apparatus as claimed in claim 28, wherein the light control layer has the reflection wavelength selection function by having its surface part coated with a mixture of first toner particles having a higher reflectance for light of a red wavelength range than for light of the other wavelength ranges, second toner particles having a higher reflectance for light of a green wavelength range than for light of the other wavelength ranges, and third toner particles having a higher reflectance for light of a blue wavelength range than for light of the other wavelength ranges.

34. The image display apparatus as claimed in claim 28, wherein the light control layer has a gain control function of varying the quantity of reflected light with respect to incident light, depending on an exit direction of the reflected light.

35. The image display apparatus as claimed in claim 34, wherein the light control layer has a lens effect by having plural fine concave parts in its surface part, thereby having the gain control function.

36. The image display apparatus as claimed in claim 34, wherein the base member has plural fine concave parts in its surface part, and the light control layer has a shape following the shape of the surface of the base member and has a lens effect, thereby having the gain control function.

37. The image display apparatus as claimed in claim 28, further comprising an external light reduction layer on the light control layer, the external light reduction layer being adapted for transmitting light of a wavelength range of image display light projected via the projection image forming means and for absorbing light of other wavelength ranges.

38. The image display apparatus as claimed in claim 28, further comprising an external light reduction layer on the light control layer, the external light reduction layer having plural fine shade plates for transmitting light in a direction of incidence of image display light projected via the projection image forming means and for intercepting incident light in other directions.

39. The image display apparatus as claimed in claim 28, further comprising an external light reduction layer on the light control layer, the external light reduction layer being adapted for transmitting light in a state of polarization of image display light projected via the projection image forming means and for absorbing light in other states of polarization.

40. The image display apparatus as claimed in claim 14, wherein the peripheral light generating means has a fluorescent tube having a wavelength characteristic that is different from a color reproducing wavelength in the light source, the spatial light modulator and the projection image forming means, and causes the fluorescent tube to emit the peripheral light.

41. The image display apparatus as claimed in claim 14, wherein the peripheral light generating means has a fluorescent tube and filtering means for intercepting a light beam of a partial wavelength range of light beams emitted from the fluorescent tube, and emits peripheral light having a wavelength characteristic that is different from a color reproducing wavelength in the light source, the spatial light modulator and the projection image forming means, via the filtering means.

42. The image display apparatus as claimed in claim 14, wherein the peripheral light generating means comprises a light-emitting diode and emits peripheral light having a wavelength characteristic that is different from a color reproducing wavelength in the light source, the spatial light modulator and the projection image forming means.

43. The image display apparatus as claimed in claim 14, wherein the peripheral light generating means comprises an ultraviolet light-emitting diode and a visible phosphor excited by an ultraviolet ray emitted by the ultraviolet light-emitting diode, and emits peripheral light having a wavelength characteristic that is different from a color reproducing wavelength in the light source, the spatial light modulator and the projection image forming means.

44. An image display apparatus comprising:
   a light source for emitting light of two colors of primary colors of red, green and blue, and an ultraviolet ray;
   a spatial light modulator for modulating the intensity of the light beam emitted from the light source in accordance with image information;
   projection image forming means for causing image formation on a screen, of the two-color light and the ultraviolet ray with their intensities modulated by the spatial light modulator; and
   peripheral light generating means for illuminating the screen with peripheral light having a wavelength different from the wavelengths of the two-color light and the ultraviolet ray;
   wherein the screen has a higher reflectance for the two-color light than for the peripheral light and a lower absorptivity for the two-color light than for the peripheral light, and the screen has a color conversion layer for converting the ultraviolet ray to light of the remaining one color of the primary colors.

* * * * *